United States Patent
Mori et al.

(10) Patent No.: US 10,182,184 B2
(45) Date of Patent: Jan. 15, 2019

(54) IMAGE PROCESSING APPARATUS AND IMAGE PROCESSING METHOD

(71) Applicant: SONY CORPORATION, Tokyo (JP)

(72) Inventors: Takahiro Mori, Kanagawa (JP); Satoshi Akagawa, Tokyo (JP); Takuji Higashiyama, Tokyo (JP); Masahiro Takahashi, Kanagawa (JP); Lyo Takaoka, Tokyo (JP); Masafumi Wakazono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 78 days.

(21) Appl. No.: 15/305,718

(22) PCT Filed: Jan. 21, 2015

(86) PCT No.: PCT/JP2015/051572
§ 371 (c)(1),
(2) Date: Oct. 21, 2016

(87) PCT Pub. No.: WO2015/166675
PCT Pub. Date: Nov. 5, 2015

(65) Prior Publication Data
US 2017/0048447 A1    Feb. 16, 2017

(30) Foreign Application Priority Data

May 2, 2014  (JP) .................. 2014-095272

(51) Int. Cl.
| | | |
|---|---|---|
| G02B 7/28 | (2006.01) | |
| G03B 17/18 | (2006.01) | |
| G06T 11/00 | (2006.01) | |
| G06T 11/60 | (2006.01) | |
| G06T 5/20 | (2006.01) | |

(Continued)

(52) U.S. Cl.
CPC .......... H04N 5/23212 (2013.01); G02B 7/28 (2013.01); G03B 17/18 (2013.01); G06T 11/001 (2013.01);

(Continued)

(58) Field of Classification Search
None
See application file for complete search history.

(56) References Cited

U.S. PATENT DOCUMENTS

| 5,732,288 A | 3/1998 | Muramatsu |
| 8,879,813 B1 * | 11/2014 | Solanki ................. G06T 7/0014 |
| | | 382/128 |

(Continued)

FOREIGN PATENT DOCUMENTS

| CN | 103563350 A | 2/2014 |
| JP | 08-54557 A | 2/1996 |

(Continued)

OTHER PUBLICATIONS

International Search Report and Written Opinion of PCT Application No. PCT/JP2015/051572, dated Apr. 21, 2015, 2 pages of English Translation and 12 pages of ISRWO.

*Primary Examiner* — Said Broome
*Assistant Examiner* — YuJang Tswei
(74) *Attorney, Agent, or Firm* — Chip Law Group

(57) ABSTRACT

There is provided an image processing apparatus including a presentation controller configured to control presentation of degrees of focus in a target image corresponding to an image to be processed on the basis of a first determination result corresponding to a determination result of a degree of focus in a pixel unit in the target image and a second determination result corresponding to a determination result of a degree of focus in a region unit in the target image.

20 Claims, 14 Drawing Sheets

(51) Int. Cl.
    *H04N 5/225* (2006.01)
    *H04N 5/232* (2006.01)
    *G06T 7/00* (2017.01)

(52) U.S. Cl.
    CPC ............ *G06T 11/60* (2013.01); *H04N 5/225* (2013.01); *H04N 5/232* (2013.01); *H04N 5/23293* (2013.01); *G06T 5/20* (2013.01); *G06T 7/0081* (2013.01); *G06T 7/0085* (2013.01); *G06T 11/00* (2013.01); *G06T 2207/10024* (2013.01); *G06T 2207/20081* (2013.01)

(56) References Cited

U.S. PATENT DOCUMENTS

| | | |
|---|---|---|
| 2009/0153720 A1 | 6/2009 | Suzuki et al. |
| 2010/0271549 A1* | 10/2010 | Kuwabara ............... G06T 11/60 348/564 |
| 2011/0122286 A1 | 5/2011 | Yamada et al. |
| 2013/0307993 A1 | 11/2013 | Kawarada |
| 2014/0085498 A1 | 3/2014 | Hatano |

FOREIGN PATENT DOCUMENTS

| | | |
|---|---|---|
| JP | 2004-15597 A | 1/2004 |
| JP | 2007-60328 A | 3/2007 |
| JP | 2009-163220 A | 7/2009 |
| JP | 2010-171769 A | 8/2010 |
| JP | 2013-242407 A | 12/2013 |
| WO | 2012/164896 A1 | 12/2012 |

\* cited by examiner

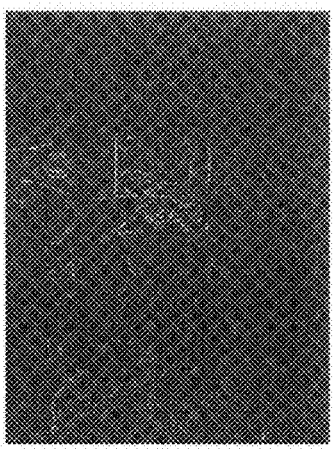
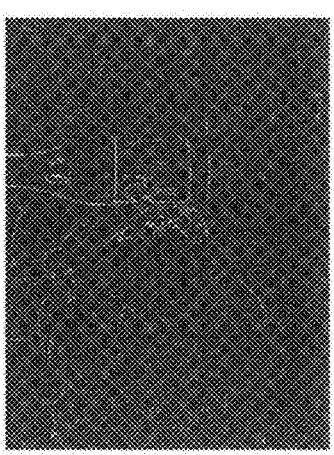
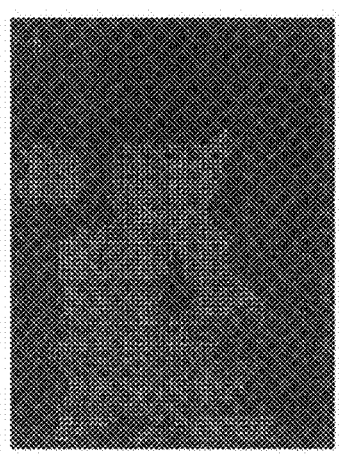
FIG. 3

FIG. 5
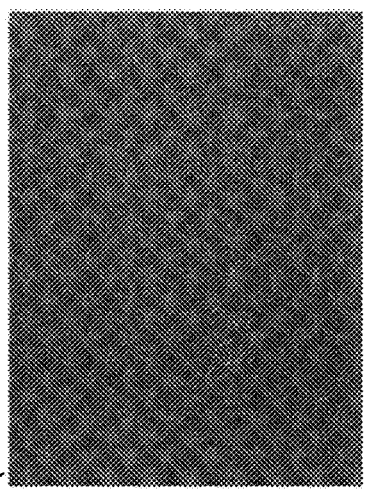
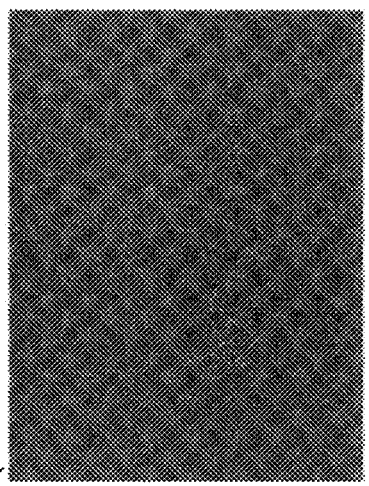
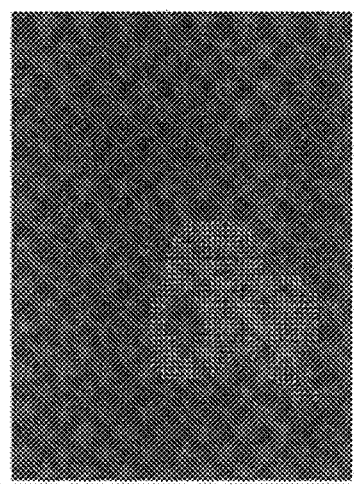

| 10 | 10 | 30 | 200 | 220 | 50 |
|----|----|----|-----|-----|-----|
| 10 | 20 | 40 | 210 | 250 | 70 |
| 20 | 10 | 70 | 190 | 230 | 180 |
| 10 | 30 | 60 | 170 | 190 | 160 |

IMAGE PROCESSING APPARATUS AND IMAGE PROCESSING METHOD

CROSS REFERENCE TO RELATED APPLICATIONS

This application is a U.S. National Phase of International Patent Application No. PCT/JP2015/051572 filed on Jan. 21, 2015, which claims priority benefit of Japanese Patent Application No. JP 2014-095272 filed in the Japan Patent Office on May 2, 2014. Each of the above-referenced applications is hereby incorporated herein by reference in its entirety.

TECHNICAL FIELD

The present disclosure relates to an image processing apparatus, an image processing method, and a program.

BACKGROUND ART

For example, as the number of valid pixels of an image captured by an imaging device and the number of pixels used to display the captured image increase, it becomes difficult to obtain focused images when images are captured by the imaging device.

In view of this, technology for improving focusing accuracy has been developed. As technology for compositing an indicator generated based on high-frequency components extracted from an image with the image and allowing a user who views the image to recognize a focused portion in the image, for example, the technology described in the following Patent Literature 1 may be exemplified. In addition, as technology for detecting high-frequency components from an image and emphasizing and displaying the edge of a subject, the technology described in the following Patent Literature 2 may be exemplified.

CITATION LIST

Patent Literature

Patent Literature 1: JP 2009-111487A
Patent Literature 2: JP 2010-114556A

SUMMARY OF INVENTION

Technical Problem

For example, as in the technology described in Patent Literature 1, an indicator based on high-frequency components of an image is composited with the image such that a user may visually recognize a focused portion. However, the user may not recognize focus of details of the image with the indicator generated by integrating high-frequency components of a specific region (in the vertical direction or horizontal direction) as in the technology described in Patent Literature 1.

Furthermore, by emphasizing the edges of a subject in display as in the technology described in Patent Literature 2, while a user may recognize details of a portion on which the user wants to focus, edges are not indicated in a portion having no high-frequency component in an image even if, for example, the technology described in Patent Literature 2 is used, and thus the user may not recognize a focused region.

The present disclosure provides a novel and improved image processing apparatus, image processing method and program to allow a user to recognize degrees of focus in an image.

Solution to Problem

According to the present disclosure, there is provided an image processing apparatus including: a presentation controller configured to control presentation of degrees of focus in a target image corresponding to an image to be processed on the basis of a first determination result corresponding to a determination result of a degree of focus in a pixel unit in the target image and a second determination result corresponding to a determination result of a degree of focus in a region unit in the target image.

In addition, according to the present disclosure, there is provided an image processing apparatus including: a first determination unit configured to determine a degree of focus in a pixel unit from a target image corresponding to an image to be processed; and a second determination unit configured to determine a degree of focus in a region unit from the target image.

In addition, according to the present disclosure, there is provided an image processing method performed by an image processing apparatus, including: a step of controlling presentation of degrees of focus in a target image corresponding to an image to be processed on the basis of a first determination result corresponding to a determination result of a degree of focus in a pixel unit in the target image and a second determination result corresponding to a determination result of a degree of focus in a region unit in the target image.

In addition, according to the present disclosure, there is provided a program for causing a computer to execute: a step of controlling presentation of degrees of focus in a target image corresponding to an image to be processed on the basis of a first determination result corresponding to a determination result of a degree of focus in a pixel unit in the target image and a second determination result corresponding to a determination result of a degree of focus in a region unit in the target image.

Advantageous Effects of Invention

According to the present disclosure, a user may recognize degrees of focus in an image.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 3 is an explanatory diagram of examples of images processed by the image processing apparatus according to the present embodiment.

FIG. 5 is an explanatory diagram of examples of images processed by the image processing apparatus according to the present embodiment.

DESCRIPTION OF EMBODIMENT(S)

Figure 1:
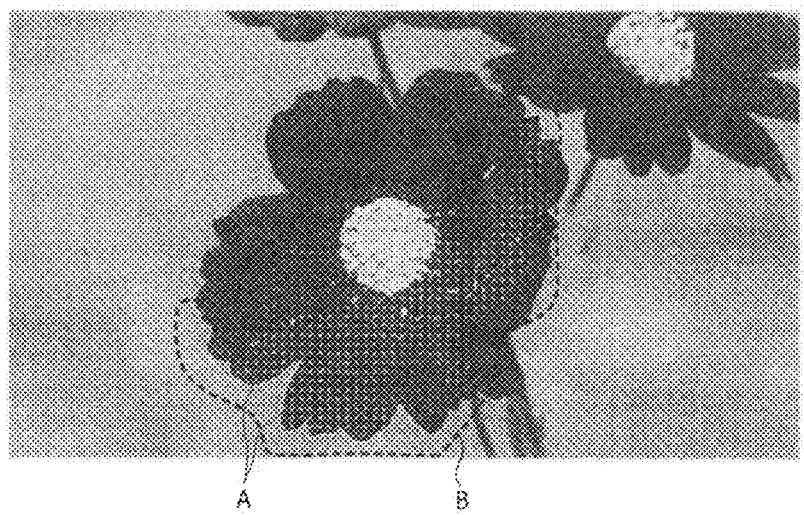
FIG. 1 is an explanatory diagram of an example of a presented image according to the present embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Hereinafter, a description will be given in the following order.
1. Image processing method according to present embodiment
2. Image processing apparatus according to present embodiment
3. Programs according to present embodiment.

(Image Processing Method According to Present Embodiment)

An image processing method according to the present embodiment will be described first prior to description of a configuration of an image processing apparatus according to the present embodiment. Hereinafter, the image processing method according to the present embodiment will be described with examples in which the image processing apparatus according to the present embodiment performs processing of the image processing method according to the present embodiment.

The image processing apparatus according to the present embodiment controls presentation of a degree of focus in an image to be processed (referred to hereinafter as a "target image") (presentation control processing).

The image processing apparatus according to the present embodiment controls presentation of degrees of focus in the target image on the basis of a determination result of a degree of focus in a pixel unit in the target image (referred to hereinafter as a "first determination result") and a determination result of a degree of focus in a region unit in the target image (referred to hereinafter as a "second determination result").

Here, the target image according to the present embodiment is a captured image generated by an imaging device including a plurality of imaging elements. For example, a captured image according to the present embodiment may be a through image (an image generated by an imaging device and displayed on a display screen without being recorded in a recording medium, also known as a live view image) and an image generated by an imaging device and read from a recording medium. Hereinafter, a case in which a captured image according to the present invention is a through image is exemplified.

In addition, "control of presentation of degrees of focus in the target image" according to the present embodiment may be control of generation of, for example, an image based on the target image (referred to hereinafter as a "presented image").

The presented image according to the present embodiment is an image on which degrees of focus are indicated according to a presentation scheme based on at least one of the first determination result and the second determination result. For example, the following images may be presented as examples of the presented image according to the present embodiment.

A presented image on which a degree of focus in a pixel unit based on the first determination result is indicated A presented image on which a degree of focus in a region unit based on the first determination result is indicated A presented image on which a degree of focus in a pixel unit based on the first determination result and a degree of focus in a region unit based on the second determination result are indicated The image processing apparatus according to the present embodiment, for example, generates a presented image as processing for generation control according to the present embodiment. In addition, the image processing apparatus according to the present embodiment allows an external apparatus (or an external device) of the image processing apparatus according to the present embodiment, for example, to generate a presented image as processing for generation control according to the present embodiment.

Detailed examples of the presented image according to the present embodiment and processing for generating the presented image according to the present embodiment will be described below.

The image processing apparatus according to the present embodiment performs a process for generation control as a presentation control process according to the present embodiment such that a user may recognize degrees of focus in the target image, for example, by viewing a generated presented image. Accordingly, the image processing apparatus according to the present embodiment performs processing for generation control as presentation control processing according to the present embodiment and thus the user may recognize degrees of focus in an image.

"Control of presentation of degrees of focus in the target image" according to the present embodiment is not limited to the above.

For example, "control of presentation of degrees of focus in the target image" according to the present embodiment may further include display control for displaying the generated presented image on a display screen. Here, when "control of presentation of degrees of focus in the target image" according to the present embodiment includes display control, the presentation control processing according to the present embodiment is performed, for example, when the display screen displaying the presented image is in a state in which display is possible (e.g., when the power is on). The presentation control processing according to the present embodiment is not limited to the above. For example, even when the display screen is not in a state in which display is possible (e.g., when the power is off), the presentation control processing according to the present embodiment may allow the display screen to be in a state in which display is possible and then display the presented image on the display screen.

The image processing apparatus according to the present embodiment, for example, displays the generated presented image on a display screen of a display unit (which will be described later) included in the image processing apparatus according to the present embodiment through processing according to display control according to the present embodiment. In addition, the image processing apparatus according to the present embodiment, for example, allows an external display device of the image processing apparatus according to the present embodiment to display the generated presented image through processing according to display control according to the present embodiment. For example, the image processing apparatus according to the present embodiment allows the display device to display the presented image by enabling a communication unit (which will be described later) included in the image processing apparatus according to the present embodiment or a communication device connected to the image processing apparatus according to the present embodiment to transmit data representing the presented image and a display command to the display device.

Processing for display control according to the present embodiment is not limited to the above. For example, the image processing apparatus according to the present embodiment may magnify and display a part of the generated presented image (e.g., a focused part of the presented image) (which is called display of the presented image according to magnified focus). In addition, the image processing apparatus according to the present embodiment may display the presented image on the display screen in various manners such as displaying the presented image in a part of the target image, such as picture in picture (PinP).

Hereinafter, a case in which the image processing apparatus according to the present embodiment performs processing for generation of the presented image and processing for display control, that is, the image processing apparatus according to the present embodiment displays the presented image on the display screen, is exemplified.

Even when the image processing apparatus according to the present invention performs processing according to generation of the presented image as the presentation control processing for the present embodiment, the presented image is manually displayed on the display screen, for example, according to an operation of the user, and thus the same effect as that obtained when the image processing apparatus according to the present embodiment displays the presented image on the display screen, which will be described later, is achieved.

The first determination result according to the present embodiment is a result of determination of a degree of focus in a pixel unit with respect to the target image and indicates a focused portion in the target image. The first determination result according to the present embodiment may be, for example, an edge image including an edge detected from the target image.

A process of determining a degree of focus in a pixel unit from the target image may be performed by the image processing apparatus according to the present embodiment or an external device of the image processing apparatus according to the present embodiment. An example of the first determination result according to the present embodiment and an example of the process of determining a degree of focus in a pixel unit according to the present embodiment will be described later.

The second determination result according to the present embodiment is a result of determination of a degree of focus with respect to the target image in a region unit obtained by dividing the target image and indicates a focused region in the target image.

Regions according to the present embodiment may be rectangular regions obtained by dividing the target image in horizontal and vertical directions. The regions according to the present embodiment are not limited to the aforementioned regions and may be regions having an arbitrary form that are obtained by dividing the target image. In the following, a case in which the regions according to the present embodiment are rectangular regions obtained by equally dividing the target image in horizontal and vertical directions is exemplified.

In addition, a decided image generated based on a score map indicating degrees of focus of respective regions as numerical values may be presented as an example of the second determination result according to the present embodiment. For example, the decided image according to the present embodiment is generated by representing only regions having values equal to or greater than a predetermined threshold value (or values greater than the threshold value) from among regions constituting the score map. In addition, the second determination result according to the present embodiment may include, for example, the score map. In addition, for example, when a process of generating the decided image is performed as part of the presentation control process according to the present embodiment, the second determination result according to the present embodiment may be the score map.

The process of determining a degree of focus in a region unit from the target image may be performed by the image processing apparatus according to the present embodiment or an external device of the image processing apparatus according to the present embodiment. An example of the second determination result according to the present embodiment and an example of the process of determining a degree of focus in a region unit according to the present embodiment will be described later.

The image processing apparatus according to the present embodiment performs the following processes (A) to (C) as the presentation control processing according to the present embodiment to display the presented image on the display screen.

(A) Example of Processing when Presented Image on which Focusing Degree Per Pixel is Indicated is Displayed When a presented image on which a degree of focus in a pixel unit based on the first determination result is indicated is displayed, the image processing apparatus according to the present embodiment generates, for example, an image overlapping an edge image (first determination result) or an image based on the edge image on a target image as the presented image on which a degree of focus in a pixel unit is indicated. The image based on the edge image according to the present embodiment may be an image generated by processing the edge image such that an edge represented by the edge image is not changed, such as an image generated by changing the color, color density and brightness of the edge image.

The presented image on which a degree of focus in a pixel unit is indicated according to the present embodiment may be an image generated by compositing the target image and the edge image (or an image based on the edge image; the same hereinafter) or an image generated by overlapping the target image and the edge image as separate layers.

In addition, the image processing apparatus according to the present embodiment displays, for example, the presented image on which a degree of focus in a pixel unit is indicated, that is, the presented image generated by overlapping the edge image on the target image, on the display screen.

Accordingly, the user may recognize degrees of focus in details of the target image according to the edge image overlapping the target image when viewing the presented image on which a degree of focus in a pixel unit is indicated, which is displayed on the display screen.

(B) Example of Processing when Presented Image on which Degree of Focus in a Region Unit is Indicated is Displayed When a presented image on which a degree of focus in a region unit based on the second determination result is indicated is displayed, the image processing apparatus according to the present embodiment, for example, generates an image overlapping a decided image (second determination result) or an image based on the decided image on the target image as the presented image on which a degree of focus in a region unit is indicated. For example, an image generated by processing the decided image, such as an image generated by changing the color, color density and brightness of the decided image, may be presented as an example of the image based on the decided image according to the present embodiment.

The presented image on which a degree of focus in a region unit according to the present embodiment may be an image generated by compositing the target image with the decided image (or an image based on the decided image; the same hereinafter) or an image generated by overlapping the target image and the decided image as separate layers.

In addition, the image processing apparatus according to the present embodiment, for example, displays the presented image on which a degree of focus in a region unit is indicated, that is, the presented image generated by overlapping the decided image on the target image, on the display screen.

Accordingly, the user may recognize a focused region based on the decided image overlapping the target image when viewing the presented image on which a degree of focus in a region unit is indicated, which is displayed on the display screen. In addition, since the focused region corresponds to, for example, the range of depth of field, the user may recognize the range of depth of field according to the decided image overlapping the target image.

(C) Example of Processing when Presented Image on which Degree of Focus in a Pixel Unit and Degree of Focus in a Region Unit are Indicated is Displayed When a presented image on which a degree of focus in a pixel unit and a degree of focus in a region unit are indicated is displayed, the image processing apparatus according to the present embodiment, for example, generates an image by overlapping the edge image and the decided image on the target image as the presented image.

In addition, the image processing apparatus according to the present embodiment displays the presented image on which a degree of focus in a pixel unit and a degree of focus in a region unit are indicated, that is, the presented image generated by overlapping the edge image and the decided image on the target image, on the display screen.

FIG. 1 is an explanatory diagram of an example of a presented image according to the present embodiment. FIG. 1 illustrates an example of a presented image on which a degree of focus in a pixel unit and a degree of focus in a region unit are indicated. A illustrated in FIG. 1 indicates an example of an edge represented by an edge image overlapping a target image. In addition, B illustrated in FIG. 1 indicates an example of a decided image overlapping the target image.

For example, the user may recognize degrees of focus in details of the target image according to the edge (A of FIG. 1) represented by the edge image overlapping the target image when viewing the presented image illustrated in FIG. 1, which is displayed on the display screen. Accordingly, the user may visually recognize details of a focused portion of the target image according to the edge (A of FIG. 1) represented by the edge image overlapping the target image when viewing the presented image, and thus focusing may be easily driven.

In addition, for example, when viewing the presented image shown in FIG. 1, the user may visually recognize focused portions in the target image as a plane according to the decided image (B of FIG. 1) overlapping the target image and thus recognize a focused region (the range of depth of field). Furthermore, since the user may visually recognize focused portions in the target image as a plane according to the decided image (B of FIG. 1) overlapping the target image when viewing the presented image, the user may recognize the focused region more rapidly.

Accordingly, the user may recognize both degrees of focus in details in the target image and the focused region (the range of depth of field) according to the edge image and the decided image overlapping the elephant image when viewing the presented image displayed on the display screen. In addition, since the user may recognize both degrees of focus in details in the target image and the focused region (the range of depth of field), the user may recognize degrees of focus in the target image more easily and intuitively.

Furthermore, when the presented image according to the present embodiment is a presented image generated by overlapping the edge image and the decided image on the target image, a degree of focus in a region in which there is no edge in the target image may be recognized according to the decided image overlapping the target image.

The image processing apparatus according to the present embodiment generates the presented image and display the generated presented image on the display screen, for example, by performing the processes (A) to (C) as the presentation control processing according to the present embodiment.

Here, the presented image according to the present embodiment is an image on which at least one of a degree of focus in a pixel unit and a degree of focus in a region unit is indicated, as described above.

Accordingly, the image processing apparatus according to the present embodiment may allow the user to recognize degrees of focus in an image by performing the processes (A) to (C) as the presentation control process according to the present embodiment.

Since the user may recognize degrees of focus in the image when viewing the presented image according to the present embodiment, the user may perform focusing of the imaging device while checking the view angle of the target image. Accordingly, the image processing apparatus according to the present embodiment may improve operability of the imaging device, for example, by performing the processes (A) to (C) as the presentation control processing according to the present embodiment.

The image processing apparatus according to the present embodiment may allow the user to recognize degrees of focus in an image, for example, by performing the aforementioned presentation control processing as processing according to the image processing method according to the present embodiment.

The presentation control processing represents processing according to the image processing method according to the present embodiment for convenience. Accordingly, processing according to the image processing method according to the present embodiment may recognize the aforementioned presentation control processing as two or more processes (according to an arbitrary division scheme).

Processing according to the image processing method according to the present embodiment is not limited to the aforementioned processes.

For example, the image processing apparatus according to the present embodiment may perform at least one of the process of determining a degree of focus in a pixel unit from the target image and the process of determining a degree of focus in a region unit from the target image as processing according to the image processing method according to the present embodiment.

When the image processing apparatus according to the present embodiment performs at least one of the process of determining a degree of focus in a pixel unit from the target image and the process of determining a degree of focus in a region unit from the target image, the image processing apparatus according to the present embodiment performs the presentation control processing using results (the first determination result and/or the second determination result) of the performed processes.

An example of a configuration of the image processing apparatus according to the present embodiment and the process according to the image processing method according to the present embodiment will be described.

(Image Processing Apparatus According to Present Embodiment)

Figure 2:
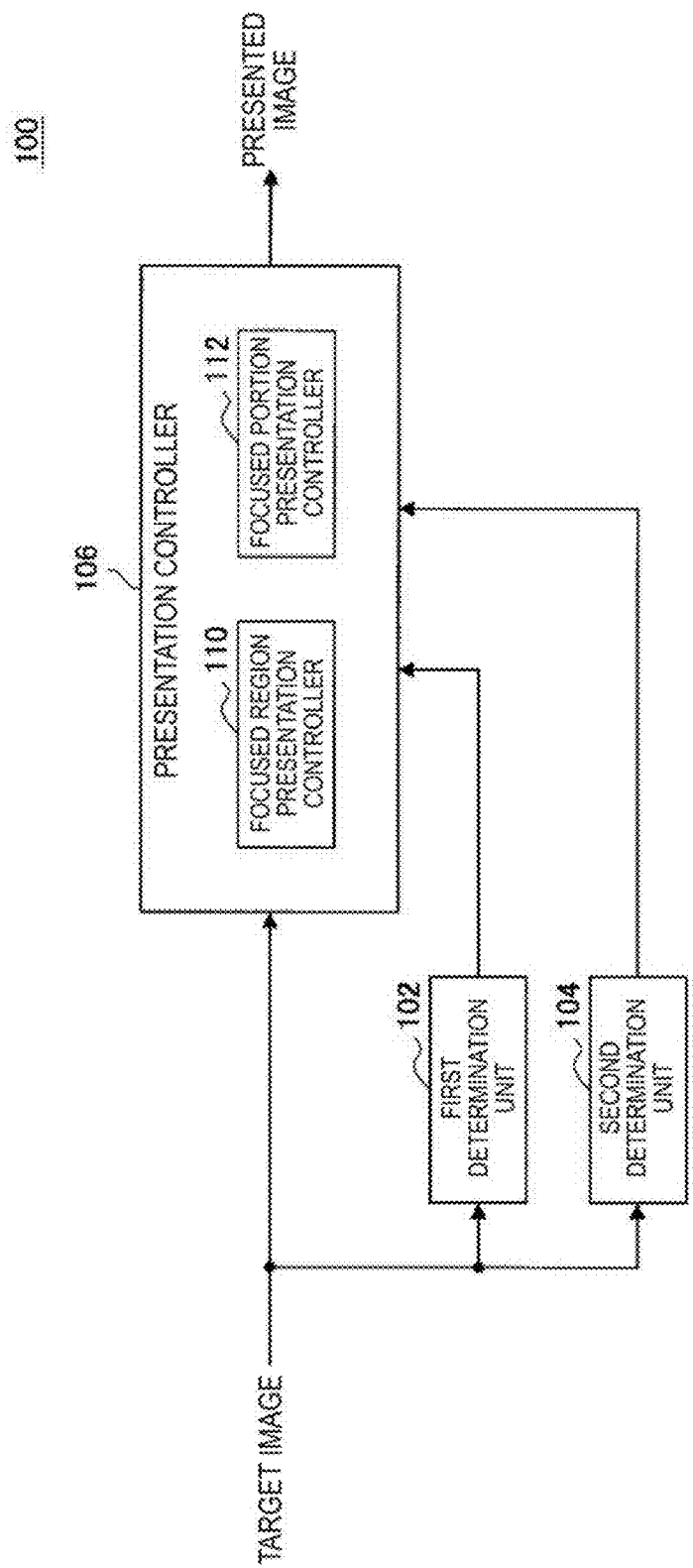
FIG. 2 is a block diagram illustrating an example of a configuration of an image processing apparatus according to the present embodiment.
Figure 4:
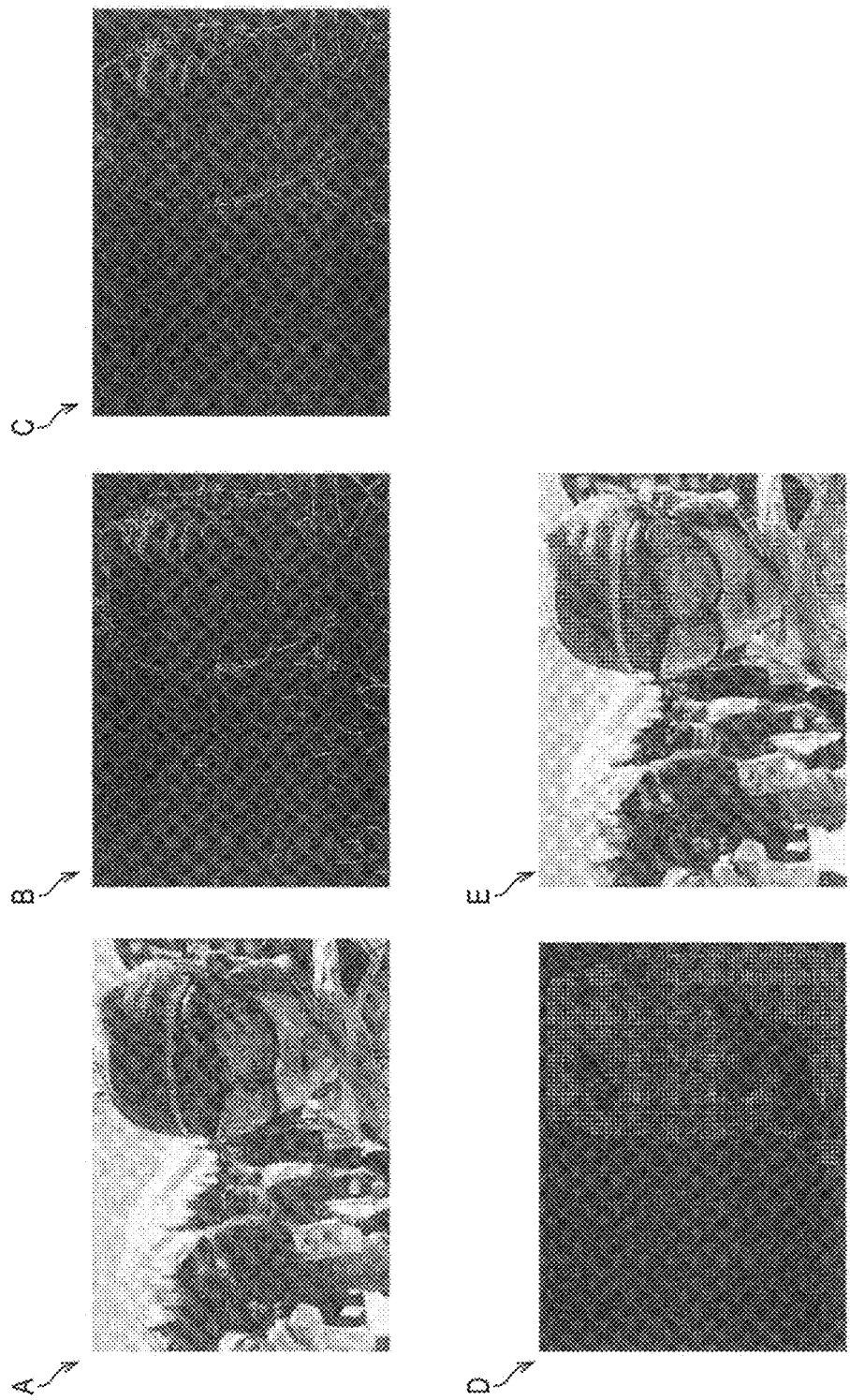
FIG. 4 is an explanatory diagram of examples of images processed by the image processing apparatus according to the present embodiment.
Figure 6:
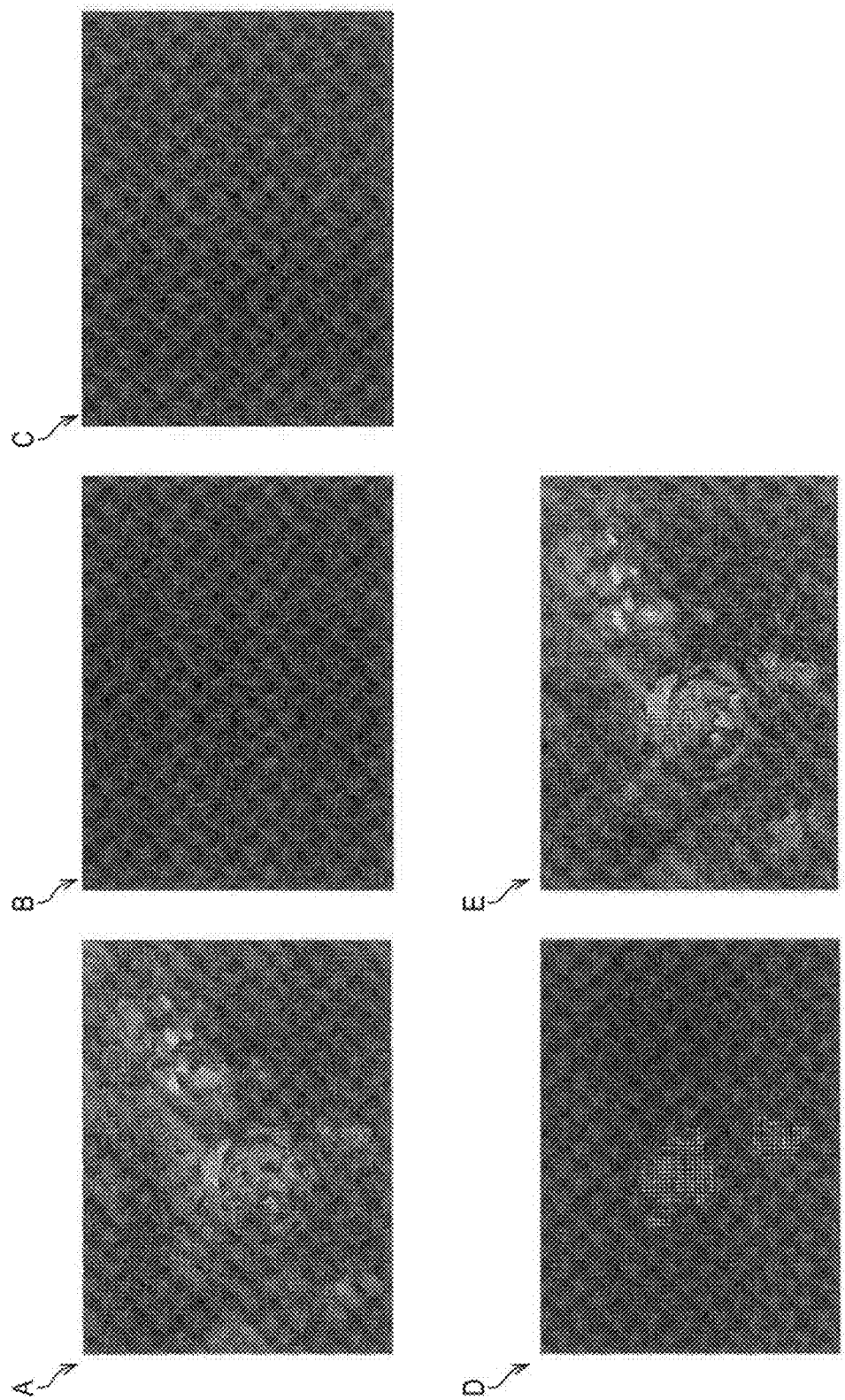
FIG. 6 is an explanatory diagram of examples of images processed by the image processing apparatus according to the present embodiment.
Figure 7:
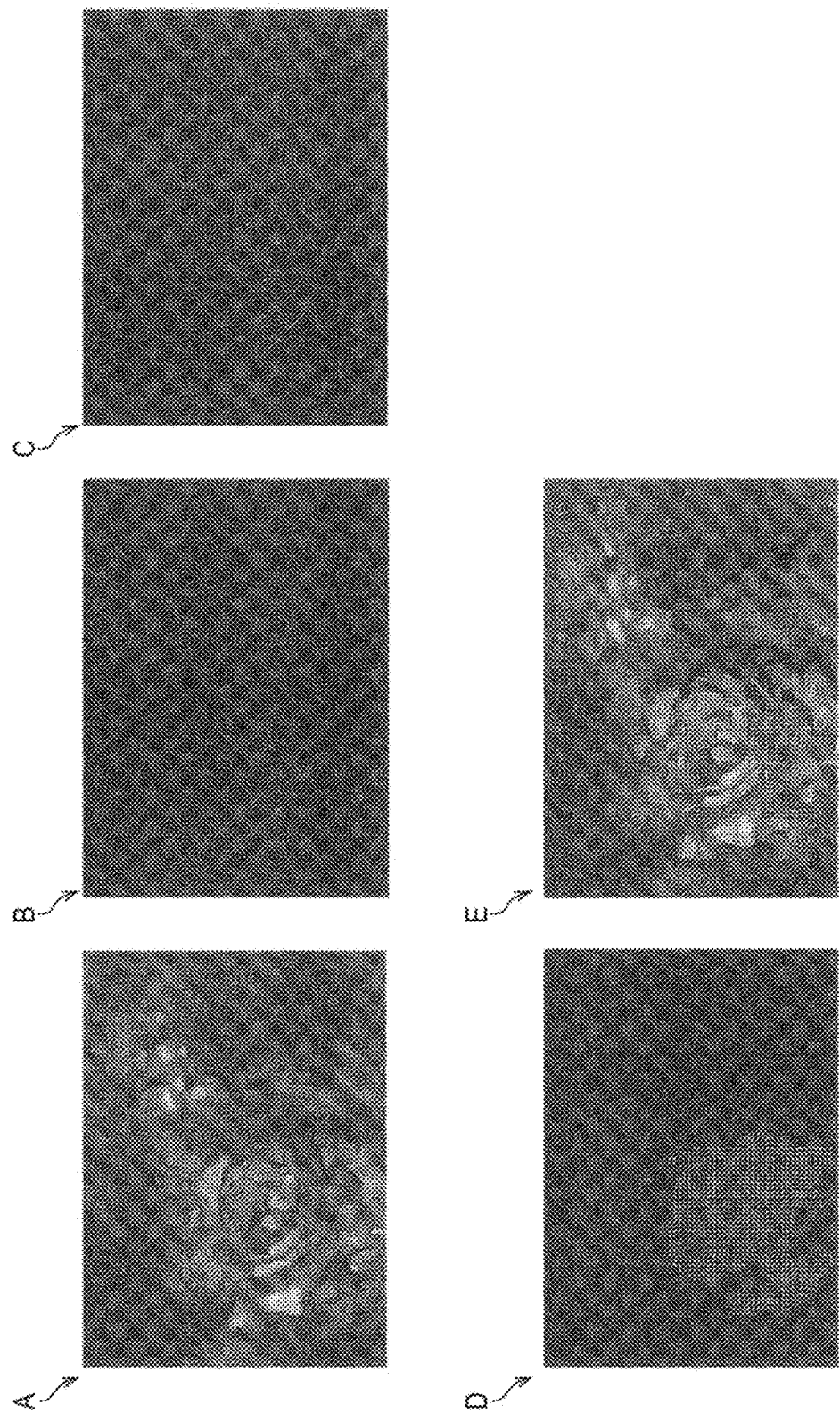
FIG. 7 is an explanatory diagram of examples of images processed by the image processing apparatus according to the present embodiment.
Figure 8:
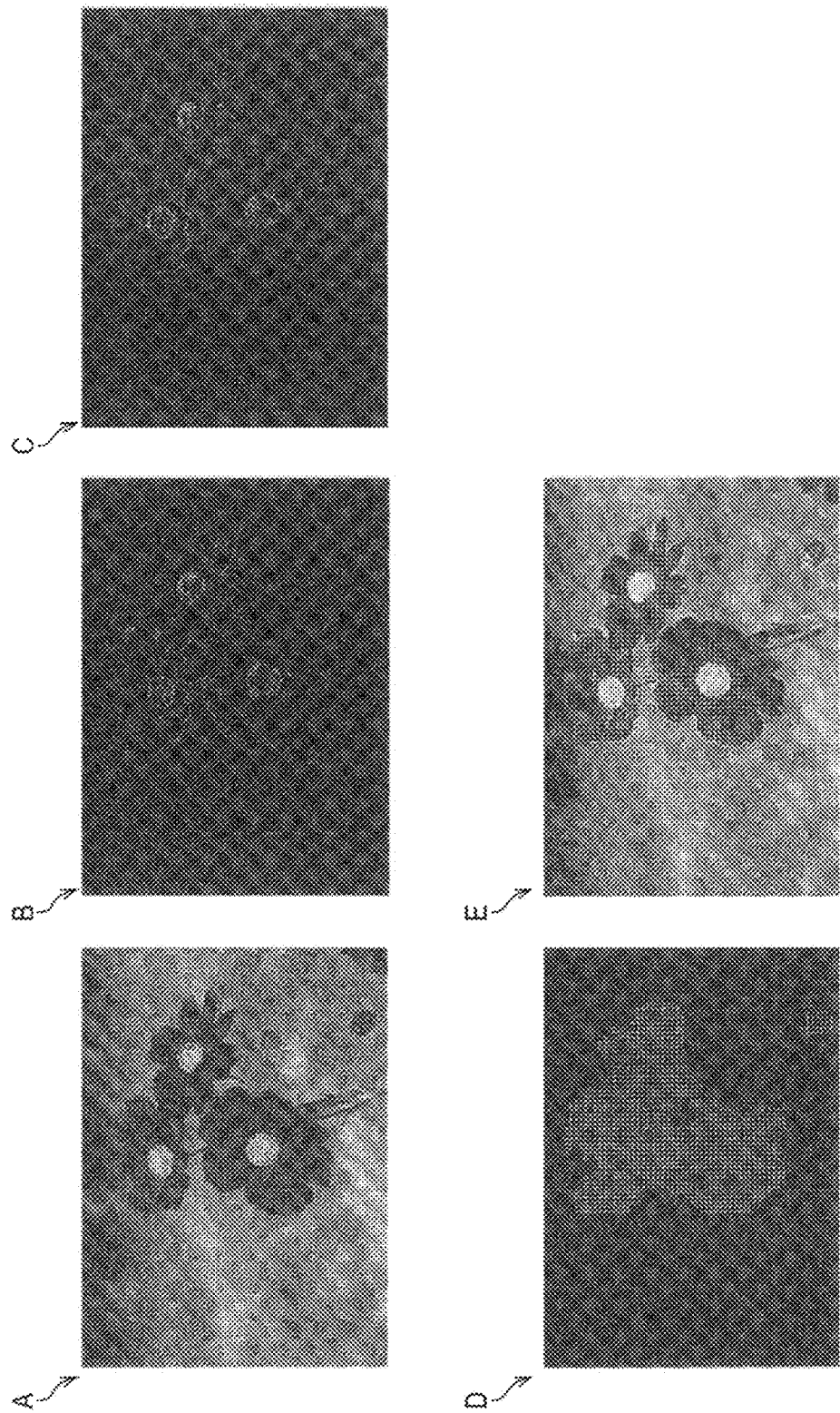
FIG. 8 is an explanatory diagram of examples of images processed by the image processing apparatus according to the present embodiment.

FIG. 2 is a block diagram illustrating an example of the configuration of the image processing apparatus 100 according to the present embodiment.

FIGS. 3 to 8 are explanatory diagrams of examples of images according to processing in the image processing apparatus 100 according to the present embodiment. A illustrated in FIGS. 3 to 8 represents examples of target images. B illustrated in FIGS. 3 to 8 represents examples of edge images (examples of the first determination result) obtained from the target images represented by A in FIGS. 3 to 8, and C illustrated in FIGS. 3 to 8 represents other examples of the edges images (examples of the first determination result). B and C illustrated in FIGS. 3 to 8 represent edge images obtained when the filter factor and type of a filter for obtaining the edge images from the target images are changed, and C illustrated in FIGS. 3 to 8 may be edge images in which only regions determined to be focused regions in the target images represented by A in FIGS. 3 to 8 are indicated. D illustrated in FIGS. 3 to 8 represents examples of decided images and E illustrated in FIGS. 3 to 8 represents examples of presented images.

An example of the configuration of the image processing apparatus according to the present embodiment will be described with reference to the images illustrated in FIGS. 3 to 8.

The image processing apparatus 100 includes, for example, a first determination unit 102, a second determination unit 104 and a presentation controller 106.

The image processing apparatus 100 may include, for example, a controller (not illustrated) for controlling the entire image processing apparatus 100, a read only memory (ROM) (not illustrated), a random access memory (RAM) (not illustrated), a communication unit (not illustrated) for performing communication with an external device such as an external display device, a storage unit (not illustrated), an operation unit (not illustrated) operable by a user and a display unit (not illustrated) for displaying various images on a display screen.

The controller (not illustrated) is configured as a processor including an arithmetic circuit such as an MPU or various circuits and controls the entire image processing apparatus 100. In addition, the controller (not illustrated) may, for example, serve as at least one of the first determination unit 102, the second determination unit 104 and the presentation controller 106 in the image processing apparatus 100. The at least one of the first determination unit 102, the second determination unit 104 and the presentation controller 106 may be configured as a dedicated (or general-purpose) circuit that may implement processing of each unit.

The ROM (not illustrated) stores, for example, control data such as a program and operation parameters used by the controller (not illustrated). The RAM (not illustrated) temporarily stores, for example, a program and the like executed by the controller (not illustrated).

The communication unit (not illustrated) is a communication means included in the image processing apparatus 100 and communicates with an external device in a wireless or wired manner via a network (or directly). In addition, the communication unit (not illustrated) performs, for example, communication under the control of the controller (not illustrated). A communication interface, which will be described later, may be presented as an example of the communication unit (not illustrated).

The storage unit (not illustrated) is a storage means included in the image processing apparatus 100 and stores various types of data such as applications. In addition, the storage unit (not illustrated) may store data processed by the image processing method according to the present embodiment, such as image data representing a captured image. For example, a recording medium which will be described below may be presented as an example of the storage unit (not illustrated).

An operation input device which will be described below may be presented as an example of the operation unit (not illustrated). In addition, a display device which will be described below may be presented as an example of the display unit (not illustrated).

[Example of Hardware Configuration of Image Processing Apparatus 100]

Figure 9:
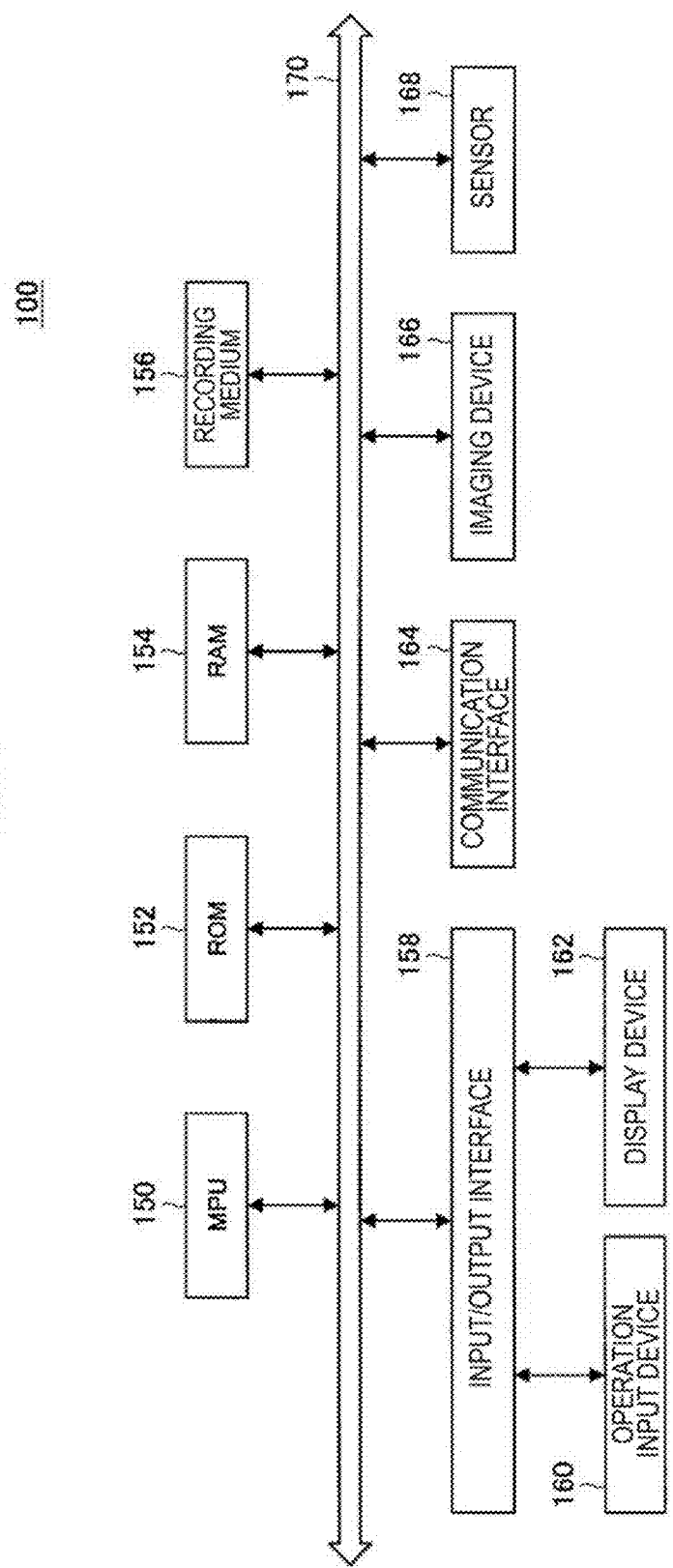
FIG. 9 is an explanatory diagram of an example of a hardware configuration of the image processing apparatus according to the present embodiment.

FIG. 9 is an explanatory diagram of an example of the hardware configuration of the image processing apparatus 100 according to the present embodiment. For example, the image processing apparatus 100 includes an MPU 150, a ROM 152, a RAM 154, a recording medium 156, an input/output interface 158, an operation input device 160, a display device 162, a communication interface 164, an imaging device 166 and a sensor 168. In addition, the image processing apparatus 100, for example, connects the respective components using a bus 170 serving as a data transfer path.

The MPU 150 is configured as a processor including an arithmetic circuit or as various processing circuits and serves as a controller (not illustrated) for controlling the entire image processing apparatus 100. In addition, the MPU 150 serves as at least one of the first determination unit 102, the second determination unit 104 and the presentation controller 106 in the image processing apparatus 100. The at least one of the first determination unit 102, the second determination unit 104 and the presentation controller 106 may be configured as a dedicated (or general-purpose) circuit that may implement processing of each unit.

The ROM 152 stores control data such as a program and operation parameters used by the MPU 150. The RAM 154 temporarily stores, for example, a program and the like executed by the MPU 150.

The recording medium 156 functions as the storage unit (not illustrated) and stores various types of data such as applications. In addition, the recording medium 156 may store data processed according to the image processing method according to the present embodiment, such as image data representing a captured image.

A magnetic recording medium such as a hard disk and a nonvolatile memory such as a flash memory may be presented as examples of the recording medium 156. The storage unit (not illustrated) may be attachable to/detachable from the image processing apparatus 100.

The input/output interface 158 is connected to, for example, the operation input device 160 and the display device 162. The operation input device 160 functions as the operation unit (not illustrated) and the display device 162 functions as the display unit (not illustrated). Here, a USB terminal, a digital visual interface (DVI) terminal, a High-Definition Multimedia Interface (HDMI) (registered trademark) terminal and various processing circuits may be presented as examples of the input/output interface 158.

The operation input device 160 is included in the image processing apparatus 100 and connected to the input/output interface 158 inside the image processing apparatus 100. For example, a button, direction keys, a rotary type selector such as a jog dial or a combination thereof may be presented as an example of the operation input device 160.

The display device 162 is included in the image processing apparatus 100 and connected to the input/output interface 158 in the image processing apparatus 100. For example, a liquid crystal display and an organic electroluminescence display (or an organic light emitting diode (OLED) display) may be presented as examples of the display device 162.

The input/output interface 158 may be connected to external devices of the image processing apparatus 100, such as the operation input device (e.g., keyboard and mouse), the display device and the imaging device. In addition, the display device 162 may be a display device that may be manipulated by the user, such as a touch device.

The communication interface 164 is a communication means included in the image processing apparatus 100 and serves as a communication unit (not illustrated) for performing wireless or wired communication with an external apparatus (or external device), such as an external imaging device and an external display device, via a network (or directly). For example, a communication antenna and radio frequency (RF) circuit (wireless communication), an IEEE 802.15.1 port and transmission/reception circuit (wireless communication), an IEEE 802.11 port and transmission/reception circuit (wireless communication) or a local area network (LAN) terminal and transmission/reception circuit (wired communication) may be presented as examples of the communication interface 164. In addition, the communication unit (not illustrated) may have a configuration corresponding to arbitrary standards for communication, such as a Universal Serial Bus (USB) terminal and transmission/reception circuit, or a configuration for communicating with an external apparatus via a network.

For example, a network according to the present embodiment may be a wired network such as a LAN and a wide area network (WAN), a wireless network such as a wireless local area network (WLAN) and a wireless wide area network (WWAN) via a base station or the Internet using a communication protocol such as the transmission control protocol/Internet protocol (TCP/IP).

The imaging device 166 is an imaging means included in the image processing apparatus 100 and generates an image (captured image) by image capturing. When the imaging device 166 is included, the image processing apparatus 100 may perform processing according to the image processing method according to the present embodiment using a captured image generated by the imaging device 166 as a target image.

The imaging device 166 includes, for example, a lens/imaging element and a signal processing circuit. The lens/imaging element includes, for example, an optical lens and an image sensor using a plurality of imaging elements such as complementary oxide semiconductors (CMOSs). The signal processing circuit includes, for example, an automatic gain control (AGC) circuit and an analog-to-digital converter (ADC), and converts an analog signal generated by the imaging element into a digital signal (image data). The signal processing circuit performs various processes related to, for example, a RAW processing. In addition, the signal processing circuit may perform various signal processes such as white balance adjustment, color tone correction, gamma correction, YCbCr conversion and edge emphasizing.

The sensor 168 is configured as, for example, an illuminance sensor, and detects external light with respect to a display screen. For example, the sensor 168 is provided at a position at which the sensor 168 may detect external light with respect to the display screen of the display device 162 or a position at which the sensor 168 may detect external light with respect to a display screen of an external display device. An example of processing using a detection result of external light with respect to the display screen will be described later.

The image processing apparatus 100 performs processing according to the image processing method according to the present embodiment using the configuration illustrated in FIG. 9. The hardware configuration of the image processing apparatus 100 according to the present embodiment is not limited to the configuration illustrated in FIG. 9.

For example, when a captured image generated by an external imaging device is processed, the image processing apparatus 100 may have a configuration in which the imaging device 166 is not included.

Furthermore, when processing using a detection result of external light with respect to the display screen, which will be described later, is not performed and when processing using a detection result of external light with respect to the display screen, obtained through an external sensor, which will be described later, is performed, the image processing apparatus 100 may have a configuration in which the sensor 168 is not included.

When the image processing apparatus 100 is configured to perform, for example, standalone processing, the image processing apparatus 100 may not include the communication interface 164. In addition, the image processing apparatus 100 may have a configuration in which the recording medium 156 and the display device 162 are not included.

An example of the configuration of the image processing apparatus 100 according to the present embodiment will be described with reference to FIG. 2. The first determination unit 102 determines a degree of focus in a pixel unit from a target image. In addition, the first determination unit 102 sends the first determination result to the presentation controller 106. The first determination unit 102 actively performs the process of determining a degree of focus in a pixel unit from the target image according to the present embodiment.

The first determination unit 102 detects an edge from the target image according to filter processing using one or more filters that are implemented by, for example, an analog filter circuit and a digital filter circuit. The first determination unit 102 transmits an edge image representing the detected edge to the presentation controller 106 as the first determination result.

Here, a high pass filter, a band pass filter, a first-order differential filter, a second-order differential filter, a third-order differential filter, a Sobel filter, a 4-direction Laplacian filter, an 8-direction Laplacian filter, a difference of Gaussians (DoG) filter and a self-quotient filter may be presented as examples of a filter according to the present embodiment. The filter according to the present embodiment is not limited to the aforementioned examples and may be an arbitrary filter that may detect an edge from an image.

For example, the first determination unit 102 obtains the edge image (the first determination result) using a predetermined filter.

Processing according to the first determination unit 102 is not limited to the aforementioned case.

For example, the first determination unit 102 may use a filter corresponding to a display screen on which a presented image is displayed.

For example, the first determination unit 102 specifies a filter corresponding to the display screen using information about the display screen (e.g., an ID indicating the display device, data indicating the resolution of the display device, data indicating the size of the display screen, etc.) on which a presented image is displayed, which is transmitted from the presentation controller 106 or the controller (not illustrated). The first determination unit 102, for example, specifies a filter corresponding to the information about the display screen on which the presented image is displayed using a table (or database; the same hereinafter) in which the information about the display screen and one or more filters are matched. The table is stored, for example, in the storage unit (not illustrated) or an external recording medium connected to the image processing apparatus 100.

The first determination unit 102 obtains the edge image by performing filter processing using a filter specified for the target object.

In addition, the first determination unit 102 may, for example, perform filtering using a thickening filter on the edge image from which the edge is extracted according to the aforementioned filter processing.

For example, the first determination unit 102 performs processing using the filter corresponding to the display screen on which the presented image is displayed, and thus the presentation controller 106, which will be described later, may generate a presented image on which degrees of focus are indicated according to a presentation scheme corresponding to the display screen and display the generated presented image on the display screen.

Here, for example, when the display screen on which the presented image is displayed is a display screen of a viewfinder included in an imaging apparatus or a display screen of a monitor included in the imaging apparatus, the size and resolution of the display screen, a viewing distance of the user and the like may be varied according to the display screen on which the presented image is displayed. When the presentation controller 106 displays the presented image on which degrees of focus are indicated according to a presentation scheme corresponding to the display screen on the display screen, the image processing apparatus 100 may display the presented image on which degrees of focus are indicated according to the presentation scheme more suitable for the display screen on the display screen.

Accordingly, the image processing apparatus 100 may allow the user to recognize degrees of focus in the image more easily according to operation of the first determination unit 102 to perform processing using the filter corresponding to the display screen on which the presented image is displayed.

The first determination unit 102 performs, for example, the aforementioned process to obtain the edges images represented, for example, by B and C illustrated in FIGS. 3 to 8.

The second determination unit 104 determines a degree of focus in a region unit from the target image. In addition, the second determination unit 104 transmits the second determination result to the presentation controller 106. The second determination unit 104 actively performs the process of determining a degree of focus in a region unit from the target image according to the present embodiment.

The second determination unit 104 determines a degree of focus in a region unit from the target image by performing, for example, the following processes (a) to (c) and obtains the second determination result.

In the following, a case in which the second determination unit 104 equally divides the target image into rectangular regions in the horizontal direction and the vertical direction and determines a degree of focus in a region unit is exemplified, and each region is indicated as "region w(n)" (n is the number of divisions of the target image). As described above, the regions according to the present embodiment are not limited to rectangular regions.

Here, while the second determination unit 104 divides the target image into regions having a predetermined size, a region setting method in the second determination unit 104 is not limited to the above.

For example, the second determination unit 104 may set regions corresponding to the display image on which the presented image is displayed.

For example, the second determination unit 104 specifies the size of a region for determining a degree of focus in a region unit, which corresponds to the display screen, using information about the display screen on which the presented image is displayed, which is transmitted from the presentation controller 106 or the controller (not illustrated). The size of the region for determining a degree of focus in a region unit corresponds to a determination size determining a degree of focus in a region unit.

For example, the second determination unit 104 specifies information about setting of the region corresponding to information about the display screen on which the presented image is displayed using a table in which the information about the display screen and the information about setting of the region (e.g., data defining divided regions, such as data indicating the size of the region and data indicating the number of divisions). The table is stored, for example, in the storage unit (not illustrated) or an external recording medium connected to the image processing apparatus 100.

In addition, the second determination unit 1094 sets regions corresponding to the display screen on which the presented image is displayed by dividing the target image on the basis of the specified information about setting of the regions.

For example, the second determination unit 104 sets the regions corresponding to the display screen on which the presented image is displayed and performs the following processes (a) to (c), such that the presentation controller 106, which will be described below, may generate the presented image on which degrees of focus are indicated according to a presentation scheme corresponding to the display screen and display the generated presented image on the display screen.

Figures 10, 11:
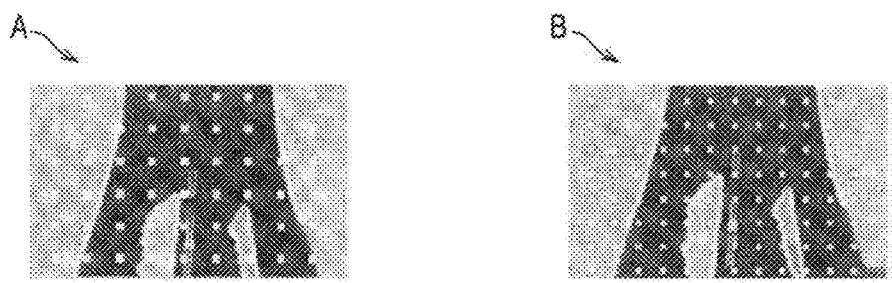
FIG. 10 is an explanatory diagram of examples of presented images on which degrees of focus are indicated according to a presentation scheme corresponding to a display screen according to the present embodiment.
FIG. 11 is an explanatory diagram of an example of processing in a second determination unit included in the image processing apparatus according to the present embodiment.

FIG. 10 is an explanatory diagram illustrating examples of presented images on which degrees of focus are indicated according to the presentation scheme corresponding to the display screen according to the present embodiment. A illustrated in FIG. 10 indicates an example of a presented image displayed on the display screen when the display screen on which the presented image is displayed is a monitor included in an imaging apparatus. B illustrated in FIG. 10 indicates an example of a presented image displayed on the display screen when the display screen on which the presented image is displayed is a display screen of a viewfinder in an imaging apparatus.

Since the viewing distance when the display screen on which the presented image is displayed is the monitor is longer than the viewing distance when the display screen on which the presented image is displayed is the viewfinder, the second determination unit 104 enlarges the regions as represented by A in FIG. 10, compared to the regions represented by B in FIG. 10. The second determination unit 104 may enlarge the regions when the display screen on which the presented image is displayed is the monitor, compared to the regions when the display screen on which the presented image is displayed is the viewfinder, for example, to enhance visibility of the presented image displayed on the display screen. In addition, for example, it may be possible to adjust an impression received by the user from the presented image displayed on the display screen when the second determination unit 104 enlarges the regions when the display screen on which the presented image is displayed is the monitor, compared to the regions when the display screen on which the presented image is displayed is the viewfinder.

According to operation of the presentation controller 106 to display the presented image on which degrees of focus are indicated according to the presentation scheme corresponding to the display screen on the display screen, the image processing apparatus 100 may display the presented image on which degrees of focus are indicated according to the presentation scheme suitable for the display screen, on the display screen. Accordingly, the image processing apparatus 100 may allow the user to recognize degrees of focus in the image more easily according to operation of the second determination unit 104 to set the regions corresponding to the display screen on which the presented image is displayed and perform the following processes (a) to (c).

(a) First Example of Processing in Second Determination Unit 104

The second determination unit 104 obtains, for example, an evaluation value per region using a filter, and determines a degree of focus in a region unit in the target image on the basis of the obtained evaluation value to obtain the second determination result.

The second determination unit 104 obtains an evaluation value of each region w(n) by performing, for example, the following process on each region w(n).

- A luminance signal is generated.
- A high-frequency component is extracted using a filter such as a high pass filter from the generated luminance signal.
- The absolute value of the extracted high-frequency component is obtained.
- Noise is removed from the obtained absolute value of the high-frequency component. An upper value may be set for the obtained absolute value of the high-frequency component.
- The noise-removed value is integrated.

When the aforementioned process is performed per region w(n), in each region w(n), high-frequency components of pixel data corresponding to each region w(n) are integrated to obtain an evaluation value.

FIG. 11 is an explanatory diagram for describing an example of processing in the second determination unit 104 included in the image processing apparatus 100 according to the present embodiment and illustrates an example of a score map on which a degree of focus is indicated as a numerical value per region w(n).

The second determination unit 104 obtains an evaluation value per region w(n) to obtain the score map, for example, as illustrated in FIG. 11. While FIG. 11 illustrates an example of the score map when the target image is divided into 24 regions, the score map according to the present embodiment is of course not limited to the example illustrated in FIG. 11.

Here, in a focused region, an edge component is indicated with a large size, and the possibility of an edge being indicated increases as the evaluation value increases.

Accordingly, the second determination unit 104 performs threshold processing using the evaluation value of each region w(n) and a predetermined threshold value and determines, for example, a region in which the evaluation value thereof is equal to or greater than the threshold value (or the evaluation value exceeds the threshold value; the same hereinafter) as a focused region.

Here, the predetermined threshold value according to the present embodiment may be a predetermined fixed value or a variable value based on a user operation and the like. Although the second determination unit 104 sets the predetermined threshold value to "128," for example, in the example illustrated in FIG. 11, the predetermined threshold value according to the present embodiment is of course not limited to "128."

The second determination unit 104 generates, for example, an image representing only regions determined as focused regions as a decided image. The first determination unit 102 sends the decided image to the presentation controller 106 as the second determination result.

As described above, the second determination unit 104 may, for example, transmit the decided image and the score map to the presentation controller 106 as the second determination result or send the score map to the presentation controller 106 as the second determination result. When the score map is sent to the presentation controller 106 as the second determination result, processing for generating the decided image is performed, for example, by the presentation controller 106.

(b) Second Example of Processing in Second Determination Unit 104

The second determination unit 104 determines a degree of focus in a region unit using a decision machine obtained according to machine learning using, for example, a focused learning image and an unfocused learning image to obtain the second determination result. Here, the decision machine according to the present embodiment processes shaking and blur degrees into numerical values on the basis of statistical properties of an image obtained according to learning.

The second determination unit 104 obtains an evaluation value per region w(n), for example, as in processing according to the aforementioned first example. The second determination unit 104 applies the obtained evaluation value in a region unit w(n) to the decision machine, performs calculations, and sets the value obtained from calculations as a new evaluation value indicating a degree of focus of each region w(n).

The second determination unit 104 may obtain the score map as illustrated in FIG. 11 by obtaining the evaluation value per region w(n), for example, as in the case in which processing according to the aforementioned first example is performed.

The second determination unit 104 determines a focused region and transmits a decided image based on the determination result to the presentation controller 106 as the second determination result, for example, as in the case in which processing according to the aforementioned first example is performed.

As described above, the second determination unit 104 may transmit, for example, the decided image and the score map to the presentation controller 106 as the second determination result or send the score map to the presentation controller 106 as the second determination result.

(c) Third Example of Processing in Second Determination Unit 104

In processing according to the first example (a) and processing according to the second example (b), a focused region is determined by performing threshold processing using a predetermined threshold value on the evaluation value of each region w(n). However, processing in the second determination unit 104 according to the present embodiment is not limited to processing of determining a focused region by performing threshold processing using a common threshold value on the evaluation value of each region w(n).

For example, the second determination unit 104 may determine a degree of focus based on a first determination criterion corresponding to a predetermined criterion for a region including no object in the target image and determine a degree of focus based on a second determination criterion corresponding to an object for a region including the object in the target image.

Here, determination of a focused region according to threshold processing using the predetermined threshold, such as processing according to the first example (a) and processing according to the second example (b), may be presented as an example of determination of a degree of focus based on the first determination criterion according to the present embodiment.

Furthermore, determination of a focused region according to threshold processing using a threshold value corresponding to an object detected from the target image may be presented as an example of determination of a degree of focus based on the second determination criterion according to the present embodiment.

Object detection according to the present embodiment may be performed by, for example, an object detector (not illustrated) included in the image processing apparatus 100 or an external device of the image processing apparatus 100. An arbitrary detection process of detecting a subject such as a face or plants from the target image, for example, a face detection process, may be presented as an example of object detection according to the present embodiment.

For example, the second determination unit 104 specifies a threshold value corresponding to a detected object using, for example, an object detection result and a table in which objects and threshold values are correlated to each other. The second determination unit 104 determines a focused region by performing threshold processing using the specified threshold value on a region w(n) corresponding to the object detection result. Data indicating the type of the detected object and data indicating regions including the detected object may be presented as examples of the object detection result according to the present embodiment.

Furthermore, the second determination unit 104 may specify the threshold value corresponding to the detected object using, for example, a table in which brightness, dynamic range and the quantity of high-frequency components of a region including the object and threshold values are correlated and determine a focused region according to threshold processing using the specific threshold value.

For example, as described above, the degree of focus of each region w(n) is determined based on the determination criterion per region w(n) and thus the presented image on which the degree of focus corresponding to each region w(n) is indicated may be presented to the user. Accordingly, the second determination unit 104 may determine the degree of focus of each region w(n) based on the determination criterion per region w(n), to thereby present the presented image having enhanced accuracy to the user.

Here, "enhancing accuracy" according to the present embodiment may be, for example, emphasizing and displaying an unfocused portion or region or improving a state in which a focused portion or region is not emphasized and displayed.

Even when, for example, an object is detected, the second determination unit 104 may selectively determine a degree of focus based on the second determination criterion according to the size of the detected object. For example, the second determination unit 104 determines a degree of focus according to determination of a degree of focus on the basis of the first determination criterion when the size of the detected object is equal to or smaller than a predetermined threshold value (or the size of the object is less than the threshold value). For example, when the size of the object is greater than the threshold value (or the size of the detected object is equal to or greater than the predetermined threshold value), the second determination unit 104 determines a degree of focus according to determination of a degree of focus based on the second determination criterion.

Examples of achieving "enhancing accuracy" according to the present embodiment will be described.

For example, when a face (an example of an object) is detected from the target image, a face region including the face has many low-frequency components. Accordingly, evaluation values decrease in regions w(n) corresponding to the face region even when processing according to the first example (a) is performed.

Therefore, the second determination unit 104 determines whether the regions w(n) corresponding to the face region are focused regions using a threshold value lower than a reference threshold value. As described above, for example, a presented image in which focused portions or regions have been emphasized and displayed may be generated and displayed on the display screen by determining the focused regions according to the threshold value corresponding to the face region, for the regions w(n) corresponding to the face region.

For example, when an arbitrary subject (an example of an object) is detected from the target image, the position and size of the subject are specified, and thus brightness, a dynamic range and the quantity of high-frequency components of a region including the subject may be obtained. The second determination unit 104 determines whether regions w(n) corresponding to the region including the object are focused regions using a threshold value corresponding to the obtained quantity, instead of a reference threshold. The threshold value corresponding to the obtained quantity may be, for example, a threshold value higher than a reference threshold value when the quantity of high-frequency components is large or a threshold value lower than a reference threshold value when the quantity of high-frequency components is small.

With respect to the regions w(n) corresponding to the subject, focused regions are determined according to the threshold value corresponding to the subject, as described above, and thus, for example, a presented image on which degrees of focus corresponding to the subject that the user wants to capture are indicated may be generated and displayed on the display screen, for example.

The second determination unit 104 determines a focused region based on an object detection result, and thus the presentation controller 106, which will be described below, may generate a presented image on which degrees of focus are indicated according to a presentation scheme corresponding to the object included in the target image and display the generated presented image on the display screen.

(d) Fourth Example of Processing in Second Determination Unit 104

Processing in the second determination unit 104 is not limited to processing according to the first example (a), processing according to the second example (b) and processing according to the third example (c), and the second determination unit 104 may perform an arbitrary process of determining a degree of focus of each region w(n), such as focusing determination using a phase difference sensor.

When the second determination unit 104 performs, for example, the aforementioned process, decided images represented by, for example, D illustrated in FIGS. 3 to 8 may be obtained as the second determination result.

As described above, the second determination result is not limited to the decided image, and may be the decided image and the score map or may be the score map. Hereinafter, a case in which the second determination result corresponds to the decided image and the score map is exemplified.

The presentation controller 106 actively performs presentation control processing according to the present embodiment. The presentation controller 106 controls presentation of degrees of focus in the target image on the basis of the first determination result sent from the first determination unit 102 and the second determination result sent from the second determination unit 104.

The presentation controller 106 displays a presented image on which degrees of focus are indicated according to a presentation scheme based on at least one of the first determination result and the second determination result on the display screen by performing, for example, any of the processes (A) to (C).

Here, for example, the presentation controller 106 sets, for example, the process (C), that is, "the process of displaying a presented image on which degrees of focus are indicated according to a presentation scheme based on both the first determination result and the second determination result on the display screen," as a reference process.

In addition, the presentation controller 106 may set, for example, the process (A) or the process (B), that is, "the process of displaying a presented image on which degrees of focus are indicated according to a presentation scheme based on one of the first determination result and the second determination result on the display screen," as a reference process.

When the "process of displaying a presented image on which degrees of focus are indicated according to a presentation scheme based on one of the first determination result and the second determination result on the display screen" is performed, the presentation controller 106 performs, for example, a predetermined process between the process (A) and the process (B).

The process performed by the presentation controller 106 when the "process of displaying a presented image on which degrees of focus are indicated according to a presentation scheme based on one of the first determination result and the second determination result on the display screen" is performed is not limited to the predetermined process.

For example, the presentation controller 106 may perform the process (A) or the process (B) on the basis of information on accuracy of degrees of focus corresponding to the first determination result and information on accuracy of degrees of focus corresponding to the second determination result.

The information on accuracy of degrees of focus corresponding to the first determination result according to the present embodiment may be, for example, data indicating degrees of focus in the edge image (first determination result), such as data indicating the quantity of high-frequency components included in the target image and data indicating the quantity of edges detected from the target image based on the quantity of high-frequency components included in the target image. The information on accuracy of degrees of focus corresponding to the first determination result according to the present embodiment may be generated, for example, based on the target image in the first determination unit 102 or the presentation controller 106.

The information on accuracy of degrees of focus corresponding to the second determination result according to the present embodiment may be, for example, data indicating degrees of focus, such as data indicating the ratio of focused regions in the target image to the entire target image. The information on accuracy of degrees of focus corresponding to the second determination result according to the present embodiment may be generated, for example, based on the target image in the second determination unit 104 or the presentation controller 106.

The presentation controller 106 determines a determination result having a more accurate degree of focus, for example, on the basis of the information on accuracy of degrees of focus corresponding to the first determination result and the information on accuracy of degrees of focus corresponding to the second determination result. Then, the presentation controller 106 displays a presented image on which degrees of focus are indicated according to a presentation scheme based on the determination result having a more accurate degree of focus between the first determination result and the second determination result, on the display screen. Here, the "process of determining a determination result having a more accurate degree of focus" according to the present embodiment may be an arbitrary process that may determine a determination result having a more accurate degree of focus, such as "a process using results of threshold processing performed on values according to degree of focus indicated by the information on accuracy of degrees of focus" and "a process of (directly or indirectly) comparing values according to degrees of focus indicated by the information on accuracy of degrees of focus."

In addition, the presentation controller 106 may change any of the processes (A) to (C), for example, on the basis of a predetermined user operation according to a presentation scheme change. When any of the processes (A) to (C) is switched based on the user operation, the presentation controller 106 displays a presented image on which degrees of focus are indicated according to a presentation scheme corresponding to the user operation on the display screen.

Here, the predetermined user operation is a user operation for enabling the presentation controller 106 to perform any of the processes (A) to (C). An operation on an operation unit (not illustrated) or an operation on an external operation device such as a remote controller may be presented as an example of the predetermined user operation according to the present embodiment. The presentation controller 106 may switch processes on the basis of an operation signal transmitted from the operation unit (not illustrated).

The presentation controller 106 displays a presented image on which degrees of focus are indicated according to a presentation scheme corresponding to at least one of the first determination result and the second determination result, on the display screen, for example, by performing the aforementioned process.

A configuration of the presentation controller 106 and processing in the presentation controller 106 will be described.

For example, the presentation controller 105 includes a focused region presentation controller 110 and a focused portion presentation controller 112, as illustrated in FIG. 2.

The focused region presentation controller 110 may generate an image on which a degree of focus in a region unit is indicated for the target image on the basis of the second determination result.

The focused portion presentation controller 112 may generate an image on which a degree of focus in a pixel unit is indicated for the target image on the basis of the first determination result.

Here, when the presentation controller 106 performs the process (A) or the process (B), that is, "the process of displaying a presented image on which degrees of focus are indicated according to a presentation scheme based on one of the first determination result and the second determination result on the display screen," one of the focused region presentation controller 110 and the focused portion presentation controller 112 performs the process. Then, an image generated by one of the focused region presentation controller 110 and the focused portion presentation controller 112 is displayed on the display screen, for example, as a presented image.

When the presentation controller 106 performs the process (C), that is, "the process of displaying a presented image on which degrees of focus are indicated according to a presentation scheme based on both the first determination result and the second determination result on the display screen," both the focused region presentation controller 110 and the focused portion presentation controller 112 perform the process. When both the focused region presentation controller 110 and the focused portion presentation controller 112 perform the process, one of the focused region presentation controller 110 and the focused portion presentation controller 112 processes the target image and then the other processes an image generated by the one of the focused region presentation controller 110 and the focused portion presentation controller 112.

In the presentation controller 106, the focused portion presentation controller 112 may perform the process after the focused region presentation controller 110 performs the process, or the focused region presentation controller 110 may perform the process after the focused portion presentation controller 112 performs the process. Processing order in the presentation controller 106 may be switched based on a user operation.

The configuration of the presentation controller 106 and processing in the presentation controller 106 in an example in which the presentation controller 106 performs the process (C), that is, "the process of displaying a presented image on which degrees of focus are indicated according to a presentation scheme based on both the first determination result and the second determination result on the display screen," will be described.

An example in which the focused portion presentation controller 112 performs the process after the focused region presentation controller 110 performs the process in the presentation controller 106, that is, the focused region presentation controller 110 processes the target image and the focused portion presentation controller 112 processes the image, obtained by processing the target image by the focused region presentation controller 110 will be described.

(1) Example of Processing in Focused Region Presentation Controller 110

(1-1) First Example of Processing in Focused Region Presentation Controller 110

Figure 12:
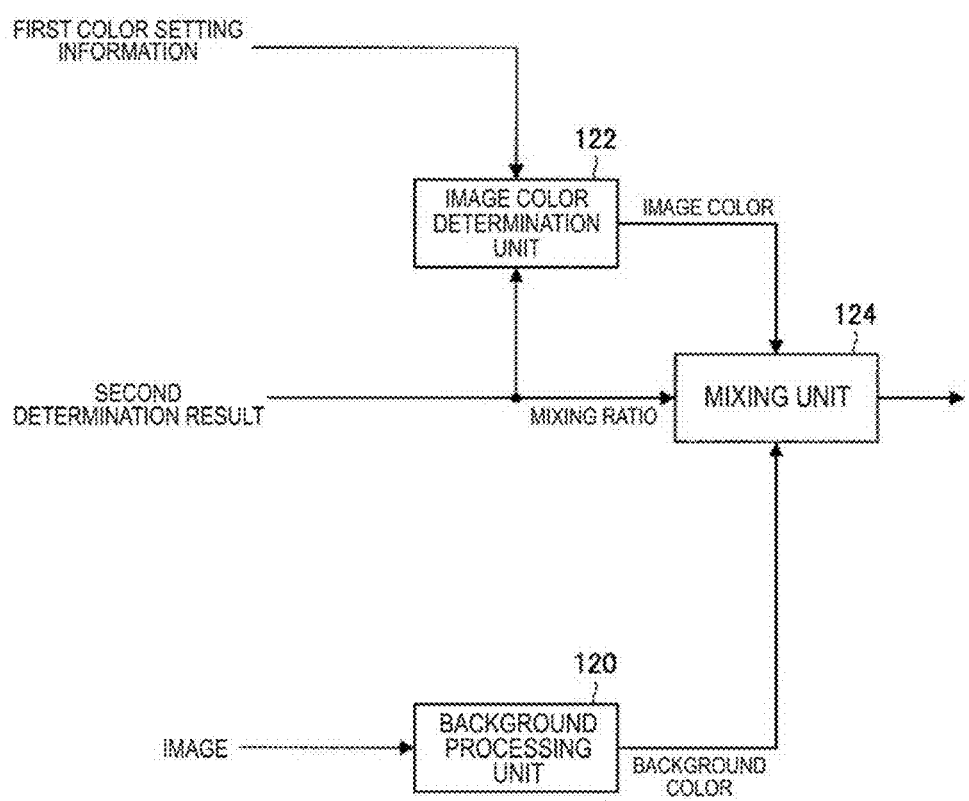
FIG. 12 is an explanatory diagram of a first example of processing in a focused region presentation controller included in the image processing apparatus according to the present embodiment.

FIG. 12 is an explanatory diagram illustrating a first example of processing in the focused region presentation controller 110 included in the image processing apparatus 100 according to the present embodiment.

The focused region presentation controller 110 according to the first example includes, for example, a background processing unit 120, a drawing color decision unit 122 and a mixing unit 124.

The target image is input to the background processing unit 120, and the background processing unit 120 adjusts colors of the target image. An arbitrary process of changing the colors of the target image, such as a process of converting the target image into a monochrome image, may be presented as an example of the process of the background processing unit 120 to adjust the colors of the target image.

The focused region presentation controller 110 adjusts the colors of the target image through the background processing unit 120, and thus the presentation controller 106 may adjust the colors of the target image, generate a presented image based on the color-adjusted target image and display the generated presented image on the display screen.

When the focused region presentation controller 110 performs the process after the focused portion presentation controller 112 performs the process in the presentation controller 106, that is, when the focused region presentation controller 110 processes an image processed by the focused portion presentation controller 112, the background processing unit 120 included in the focused region presentation controller 110 does not perform the process. In this case, the focused region presentation controller 110 according to the first example may not include the background processing unit 120.

The drawing color decision unit 122 decides a color in a decided image (an example of the second determination result) of an object indicating a focused region (which may be referred to hereinafter as a "first image color").

Objects (e.g., objects indicating focused regions w(n) in arbitrary forms such as rectangular and circular forms) represented by B of FIG. 1 and D of FIGS. 3 to 8 may be presented as examples of an object indicating a focused region in a decided image according to the present embodiment.

The drawing color decision unit 122 decides the first image color on the basis of first color setting information indicating the first image color, which is stored in, for example, the storage unit (not illustrated). The first image color represented by the first color setting information may be a predetermined fixed color or a color that is variable according to a user operation.

In addition, for example, the drawing color decision unit 122 may adjust the color represented by the first color setting information for each focused region, for example, on the basis of the second determination result and set the adjusted color as the first image color. Color adjustment for each focused region based on the second determination result may be change of luminance and color based on values corresponding to focused regions (hereinafter, "evaluation values") indicated by the score map (an example of the second determination result).

The first image color decided by the drawing color decision unit 122 may be a single color. Otherwise, the first image color according to the present embodiment may be multiple colors.

Figure 13:
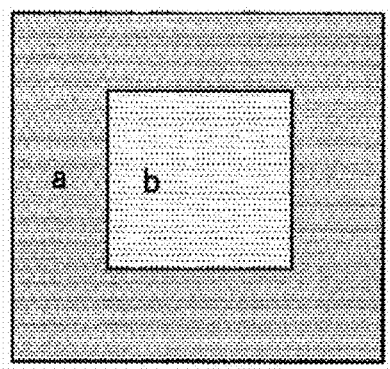
FIG. 13 is an explanatory diagram of an example of processing in the focused region presentation controller included in the image processing apparatus according to the present embodiment.

FIG. 13 is an explanatory diagram for explaining an example of processing in the focused region presentation controller 110 included in the image processing apparatus 100 according to the present embodiment and illustrates an example of the first image color decided by the drawing color decision unit 122 included in the focused region presentation controller 110.

For example, FIG. 13 illustrates an example in which an object indicating a focused region has a rectangular form and the first image color expresses the rectangular form in two colors a and b. When the object indicating the focused region is expressed in multiple colors, for example, as illustrated in FIG. 13, contrast between the focused region and surroundings of the focused region is maintained. Accordingly, the object indicating the focused region is displayed in multiple colors, for example, as illustrated in FIG. 13, and thus visibility of a presented image may be improved.

Processing in the focused region presentation controller 110 according to the first example will be described with reference to FIG. 12. The mixing unit 124 mixes the image transmitted from the background processing unit 120 and the decided image corresponding to the second determination result. The mixing unit 124 sets the color of an object indicating a focused region in the decided image (an example of the second determination result) to the first image color decided by the drawing color decision unit 122 and then mixes the image transmitted from the background processing unit 120 and the decided image.

For example, the mixing unit 124 mixes the image transmitted from the background processing unit 120 and the decided image by compositing the image transmitted from the background processing unit 120 with the decided image or overlapping the image transmitted from the background processing unit 120 and the decided image as separate layers.

When the second determination result includes the score map, the mixing unit 124 may vary a mixing ratio of the image transmitted from the background processing unit 120 and the decided image, for example, on the basis of evaluation values of focused regions indicated by the score map (an example of the second determination result). For example, the mixing unit 124 increases a mixing ratio of an object indicating a focused region as the evaluation value of the focused region increases. Here, the mixing ratio according to the present embodiment may be, for example, an alpha value in alpha blend.

The mixing unit 124 varies the mixing ratio of the image transmitted from the background processing unit 120 and the decided image on the basis of the evaluation values of the focused regions indicated by the score map (an example of the second determination result), and thus the presentation controller 106 may generate a presented image on which degrees of focus are indicated according to a presentation scheme corresponding to the second determination result and display the generated presented image on the display screen.

The focused region presentation controller 110 according to the first example may generate an image on which the degree of focus in a region unit based on the second determination result is indicated, for example, according to the configuration illustrated in FIG. 12.

When processing in the focused region presentation controller 110 is performed after processing in the focused portion presentation controller 112 is performed in the presentation controller 106, the image generated by the focused region presentation controller 110 according to the first example is an image on which both the degree of focus in a pixel unit and the degree of focus in a region unit are indicated.

The configuration of the focused region presentation controller 110 according to the first example is not limited to the aforementioned example. For example, when the focused region presentation controller 110 performs the process after the focused portion presentation controller 112 performs the process in the presentation controller 106, as described above, the focused region presentation controller 110 according to the first example may not include the background processing unit 120.

(1-2) Second Example of Processing in Focused Region Presentation Controller 110

Figure 14:
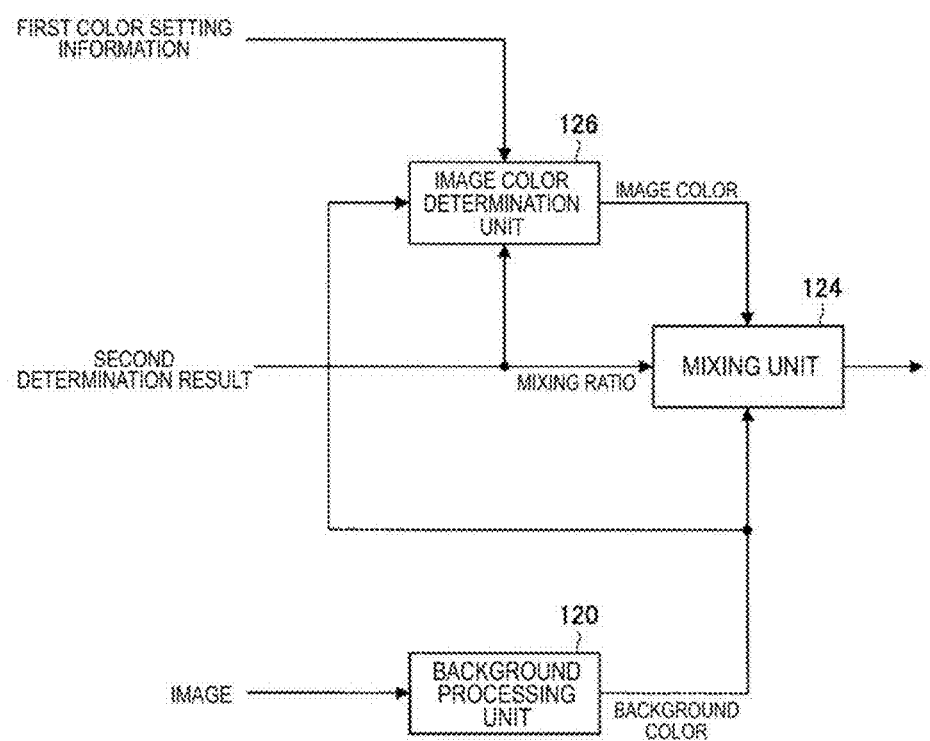
FIG. 14 is an explanatory diagram of a second example of processing in a focused region presentation controller included in the image processing apparatus according to the present embodiment.

FIG. 14 is an explanatory diagram illustrating a second example of processing in the focused region presentation controller 110 included in the image processing apparatus 110 according to the present embodiment.

The focused region presentation controller 110 according to the second example includes, for example, the background processing unit 120, a drawing color decision unit 126 and the mixing unit 124.

The background processing unit 120 has the same function as the background processing unit 120 included in the focused region presentation controller 110 according to the first example illustrated in FIG. 12. For example, the background processing unit 120 adjusts colors of the target image.

The drawing color decision unit 126 decides the first image color.

The drawing color decision unit 126 decides the first image color on the basis of the image (the target image or an image generated by processing the target image) transmitted from the background processing unit 120, in addition to the function of the drawing color decision unit 122 included in the focused region presentation controller 110, for example, according to the first example illustrated in FIG. 12.

A detailed example of processing of deciding the first image color on the basis of the image transmitted from the background processing unit 120 will be described. The drawing color decision unit 126 performs one of the following processes or two or more thereof, which may be combined, on a decided color, like the drawing color decision unit 122 illustrated in FIG. 12.

- The drawing color decision unit 126 decides the first image color by adjusting brightness of the decided color, like the drawing color decision unit 122 illustrated in FIG. 12, based on the average brightness of pixels around a focused region in the image transmitted from the background processing unit 120.
- The drawing color decision unit 126 decides the first image color by inverting or rotating the decided color, like the drawing color decision unit 122 illustrated in FIG. 12, based on the average color of pixels around a focused region in the image transmitted from the background processing unit 120.
- The drawing color decision unit 126 decides a mixing ratio (or an adjustment value for adjusting the mixing ratio) of the image transmitted from the background processing unit 120 and the decided image on the basis of the average color of pixels around a focused region in the image transmitted from the background processing unit 120.
- The drawing color decision unit 126 decides a color based on a color extracted from the target image (the image processed by the focused region presentation controller 110 when processing in the focused region presentation controller 110 is performed after processing in the focused portion presentation controller 112 is performed) as the first image color when the image transmitted from the background processing unit 120 is a monochrome image. The color based on the color extracted from the target image according to decision of the first image color may be, for example, a color of each focused region, which is extracted from each focused region in the target image, a representative color (e.g., a majority color) of colors extracted from respective focused regions, the average color of colors extracted from respective focused regions or the like.

The focused region presentation controller 110 decides the first image color or the like on the basis of the image transmitted from the background processing unit 120 through the drawing color decision unit 126, and thus the presentation controller 106 may generate a presented image on which degrees of focus are indicated according a presentation scheme corresponding to the target image and display the generated presented image on the display screen.

The mixing unit 124 has the same function as the mixing unit 124 included in the focused region presentation controller 110 according to the first example illustrated in FIG. 12, and mixes the image transmitted from the background processing unit 120 and the decided image.

The focused region presentation controller 110 according to the second example may generate an image on which a degree of focus in a region unit based on the second determination result is indicated, for example, according to the configuration illustrated in FIG. 14.

The configuration of the focused region presentation controller 110 according to the second example is not limited to the aforementioned example. For example, the focused region presentation controller 110 according to the second example may have a configuration that, like the focused region presentation controller 110 according to the first example, does not include the background processing unit 120.

(1-3) Third Example of Processing in Focused Region Presentation Controller 110

Figure 15:
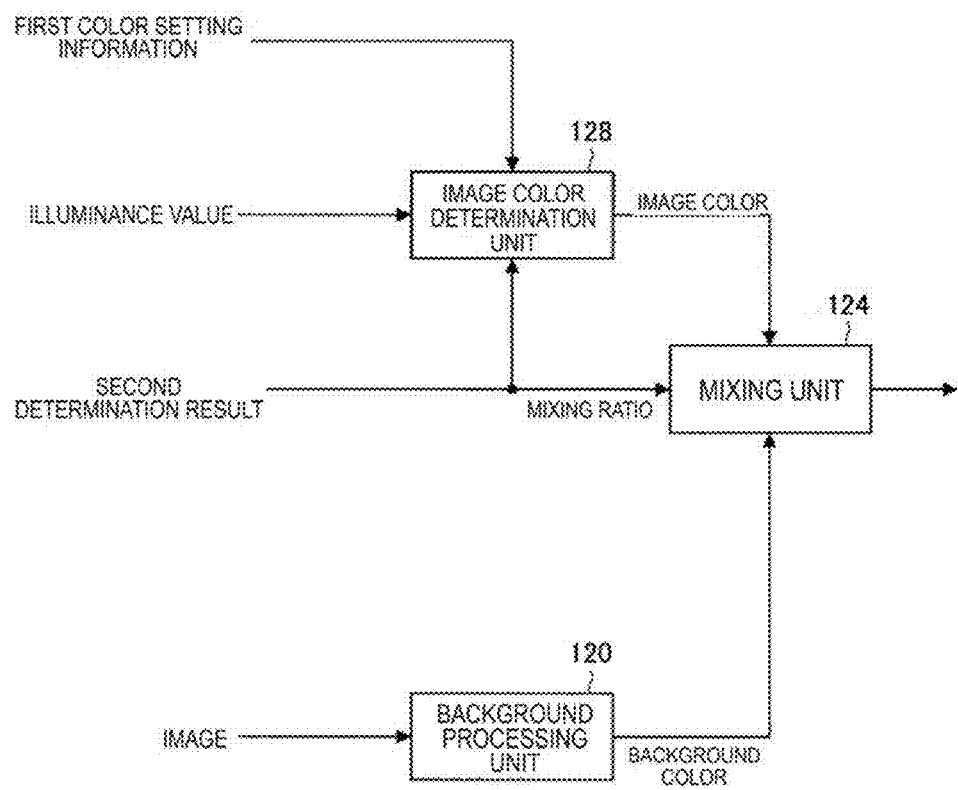
FIG. 15 is an explanatory diagram of a third example of processing in a focused region presentation controller included in the image processing apparatus according to the present embodiment.

FIG. 15 is an explanatory diagram illustrating a third example of processing in the focused region presentation controller 110 included in the image processing apparatus 100 according to the present embodiment.

The focused region presentation controller 110 according to the third embodiment includes, for example, the background processing unit 120, a drawing color decision unit 128 and the mixing unit 124.

The background processing unit 120 has the same function as the background processing unit 120 included in the focused region presentation controller 110 according to the first example illustrated in FIG. 12. The background processing unit 120, for example, adjusts colors of the target image.

The drawing color decision unit 128 decides the first image color.

The drawing color decision unit 128 decides the first image color using an illuminance value (an example of a result of detection of external light with respect to the display screen) detected by the sensor 168 or the like, in addition to the function of the drawing color decision unit 122 included in the focused region presentation controller 110 according to the first example illustrated in FIG. 12. The drawing color decision unit 128 decides the first image color by adjusting brightness of a decided color, like the drawing color decision unit 122 illustrated in FIG. 12, based on, for example, the illuminance value.

Figure 16:
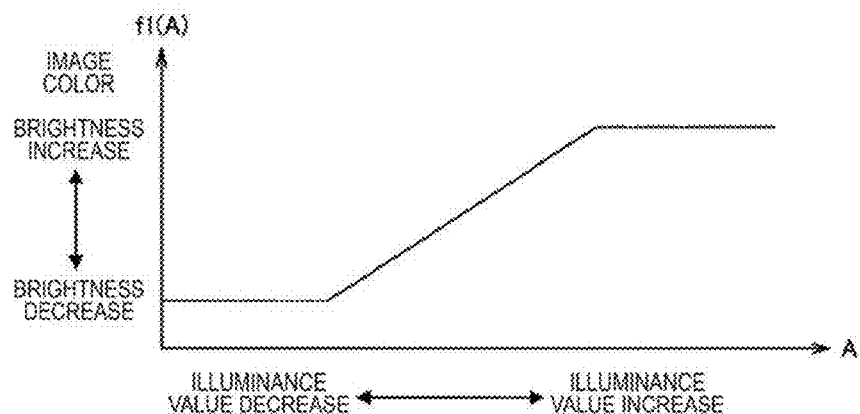
FIG. 16 is an explanatory diagram of an example of processing in the focused region presentation controller included in the image processing apparatus according to the present embodiment.

FIG. 16 is an explanatory diagram for explaining ng an example of processing in the focused region presentation controller 110 included in the image processing apparatus 100 according to the present embodiment and illustrates an example of first brightness adjustment information used for brightness adjustment in the drawing color decision unit 128 constituting the focused region presentation controller 110.

The drawing color decision unit 128 specifies a brightness value corresponding to a detected illuminance value using the first brightness adjustment information indicating illuminance values and brightness values correlated to each other, for example, as illustrated in FIG. 16. The drawing color decision unit 128 decides the first image color by adjusting brightness of the decided color, like the drawing color decision unit 122 illustrated in FIG. 12, for example, as represented by the specified brightness value.

The first brightness adjustment information according to the present embodiment may be, for example, data indicating a function by which a brightness value is uniquely calculated according to an illuminance value. Alternatively, the first brightness adjustment information according to the present embodiment may be a table in which illuminance values and brightness values are correlated to each other.

For example, when the first brightness adjustment information illustrated in FIG. 16 is used, the drawing color decision unit 128 decides the first image color such that brightness of an object indicating a focused region increases as the illuminance value corresponding thereto increases within a range from an upper value to a lower value. The corresponding relationship between illuminance values and brightness values indicated by the first brightness adjustment information according to the present embodiment is of course not limited to the example illustrated in FIG. 16.

The focused region presentation controller 110 decides the first image color using the detected illuminance value through the drawing color decision unit 128, and thus the presentation controller 106 may generate a presented image on which degrees of focus are indicated according to a presentation scheme corresponding to a result of detection of external light with respect to the display screen and display the generated presented image on the display screen.

The mixing unit 124 has the same function as the mixing unit 124 included in the focused region presentation controller 110 according to the first example illustrated in FIG. 12, and mixes the image transmitted from the background processing unit 120 and the decided image.

The focused region presentation controller 110 according to the third example may generate an image on which a degree of focus in a region unit based on the second determination result, for example, according to the configuration illustrated in FIG. 15.

The configuration of the focused region presentation controller 110 according to the third example is not limited to the aforementioned example.

For example, the focused region presentation controller 110 according to the third example may have a configuration that, like the focused region presentation controller 110 according to the first example, does not include the background processing unit 120.

In addition, the focused region presentation controller 110 according to the third example may further adjust brightness of the image (the target image or an image generated by processing the target image) transmitted from the background processing unit 120 using an illumination value detected by the sensor 168.

Figure 17:
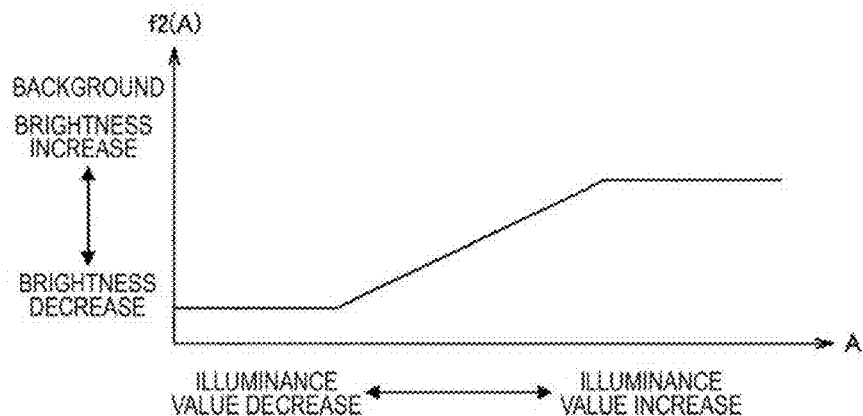
FIG. 17 is an explanatory diagram of an example of processing in the focused region presentation controller included in the image processing apparatus according to the present embodiment.

FIG. 17 is an explanatory diagram for explaining an example of processing in the focused region presentation controller 110 included in the image processing apparatus 100 according to the present embodiment and illustrates an example of second brightness adjustment information used for brightness adjustment of the image transmitted from the background processing unit 120 included in the focused region presentation controller 110.

The focused region presentation controller 110 specifies a brightness value corresponding to a detected illuminance value using the second brightness adjustment information indicating illuminance values and brightness values correlated to each other, for example, as illustrated in FIG. 17. The focused region presentation controller 110 adjusts brightness of the image transmitted from the background processing unit 120, for example, as represented by the specified brightness value.

The second brightness adjustment information according to the present embodiment may be, for example, data indicating a function by which a brightness value is uniquely calculated according to an illuminance value. Alternatively, the second brightness adjustment information according to the present embodiment may be a table in which illuminance values and brightness values are correlated to each other.

For example, when the second brightness adjustment information illustrated in FIG. 17 is used, the focused region presentation controller 110 adjusts brightness of the image transmitted from the background processing unit 120 such that the brightness of the image transmitted from the background processing unit 120 increases as the illuminance value corresponding thereto increases within a range from an upper value to a lower value.

Here, the range from the upper value to the lower value indicated by the second brightness adjustment information illustrated in FIG. 17, that is, the range in which the brightness of the image sent from the background processing unit 120 is adjusted, is narrower than the range from the upper value to the lower value indicated by the first brightness adjustment information illustrated in FIG. 16. When the range from the upper value to the lower value indicated by the second brightness adjustment information is set to be narrower than the range from the upper value to the lower value indicated by the first brightness adjustment information, as described above, for example, a degree of focus in a region unit indicated on the presented image may be further emphasized.

The corresponding relationship between illuminance values and brightness values indicated by the second brightness adjustment information according to the present embodiment is of course not limited to the example illustrated in FIG. 17.

The focused region presentation controller 110 adjusts the brightness of the image sent from the background processing unit 120 using an illuminance value detected by the sensor 168 or the like, and thus the brightness of the image transmitted from the background processing unit 120 is varied in connection with the first image color of an object indicating a focused region. Accordingly, the focused region presentation controller 110 may adjust the brightness of the image transmitted from the background processing unit 120 using the detected illuminance value, for example, to maintain contrast between the first image color of the object indicating the focused region and a background color of the image transmitted from the background processing unit 120 at a predetermined level or higher.

Here, the process of adjusting the brightness of the image transmitted from the background processing unit 120 using the detected illuminance value may be performed, for example, by the background processing unit included in the focused region presentation controller 110 or the mixing unit.

The focused region presentation controller 110 generates an image on which a degree of focus in a region unit is indicated for the target image on the basis of the second determination result using, for example, the configuration according to the first example (1-1), the configuration according to the second example (1-2) or the configuration according to the third example (1-3). The configuration of the focused region presentation controller 110 is not limited to the configuration according to the first example (1-1), the configuration according to the second example (1-2) and the configuration according to the third example (1-3). For example, the focused region presentation controller 110 may have a configuration corresponding to a combination of the configuration according to the second example (1-2) and the configuration according to the third example (1-3).

(2) Example of Processing in Focused Portion Presentation Controller 112

(2-1) First Example of Processing in Focused Portion Presentation Controller 112

Figure 18:
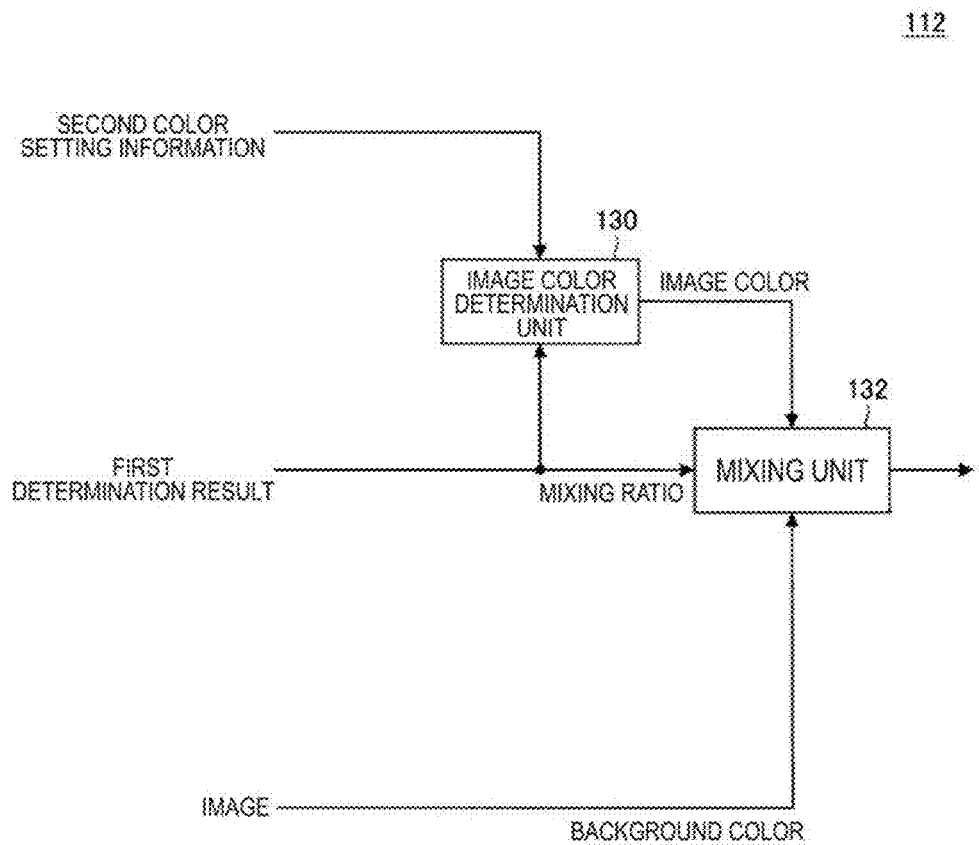
FIG. 18 is an explanatory diagram of a first example of processing in a focused portion presentation controller included in the image processing apparatus according to the present embodiment.

FIG. 18 is an explanatory diagram illustrating a first example of processing in the focused portion presentation controller 112 included in the image processing apparatus 100 according to the present embodiment.

The focused portion presentation controller 112 according to the first example includes, for example, a drawing color decision unit 130 and a mixing unit 132.

The drawing color decision unit 130 decides a color of an edge (referred to hereinafter as a "second image color") in an edge image (an example of the first determination result).

The drawing color decision unit 130 decides the second image color on the basis of second color setting information indicating the second image color, which is stored, for example, in the storage unit (not illustrated). The second image color indicated by the second color setting information may be a predetermined fixed color or a color that is variable according to a user operation.

The mixing unit 132 mixes an image input thereto and the edge image indicated by the first determination result. The mixing unit 124 sets the color of the edge in the edge image as the second image color decided by the drawing color decision unit 130 and then mixes the input image and the edge image.

Here, when the focused portion presentation controller 112 performs the process after the focused region presentation controller 110 performs the process in the presentation controller 106, the image input to the mixing unit 132 may be, for example, an image on which a degree of focus in a region unit is indicated for the target image, which is generated by the focused region presentation controller 110. When the focused region presentation controller 110 performs the process after the focused portion presentation controller 112 performs the process, the image input to the mixing unit 132 may be, for example, the target image.

The mixing unit 132 mixes the input image and the edge image, for example, by compositing the input image with the edge image or overlapping the input image and the edge image as separate layers.

The focused portion presentation controller 112 according to the first example generates an image on which a degree of focus in a pixel unit based on the first determination result is indicated, for example, according to the configuration illustrated in FIG. 18.

When the focused portion presentation controller 112 performs the process after the focused region presentation controller 110 performs the process in the presentation controller 106, the image generated by the focused portion presentation controller 112 according to the first example is an image on which both a degree of focus in a pixel unit and a degree of focus in a region unit are indicated.

The configuration of the focused portion presentation controller 112 according to the first example is not limited to the aforementioned example.

For example, the focused portion presentation controller 112 according to the first example may further include a background processing unit having the same function as the background processing unit 120 included in the aforementioned focused region presentation controller 110. When the focused portion presentation controller 112 according to the first example further includes the background processing unit, the background processing unit adjusts colors of the target image when the focused region presentation controller 112 performs the process after the focused portion presentation controller 112 performs the process, that is, when the target image is processed.

For example, when the focused region presentation controller 110 performs the process after the focused portion presentation controller 112 performs the process, the focused portion presentation controller 112 adjusts the colors of the target image through the background processing unit, and thus the presentation controller 106 may adjust the colors of the target image, generate a presented image based on the target image having adjusted colors, and display the generated presented image on the display screen.

(2-2) Second Example of Processing in Focused Portion Presentation Controller 112

The configuration of the focused portion presentation controller 112 is not limited to the first example (2-1). For example, the drawing color decision unit included in the focused portion presentation controller 112 may decide the second image color based on an image input thereto in addition to the function of the drawing color decision unit 130 included in the focused portion presentation controller 112 according to the first example illustrated in FIG. 18.

A detailed example of processing according to decision of the second image color based on the input image will be described. The drawing color decision unit included in the focused portion presentation controller 112 according to the second example performs one of the following processes or two or more thereof which may be combined on a decided color like the drawing color decision unit 130 illustrated in FIG. 18.

The drawing color decision unit included in the focused portion presentation controller 112 according to the second example decides the second image color by adjusting brightness of a decided color, like the drawing color decision unit 130 illustrated in FIG. 18, based on the average brightness of pixels surrounding pixels indicating an edge in the input image.

The drawing color decision unit included in the focused portion presentation controller 112 according to the second example decides the second image color by inverting or rotating a decided color, like the drawing color decision unit 130 shown in FIG. 18, based on the average color of pixels surrounding pixels indicating an edge in the input image.

The drawing color decision unit included in the focused portion presentation controller 112 according to the second example decides a mixing ratio (or an adjustment value for adjusting the mixing ratio) of the input image and an edge image based on the average color of pixels surrounding pixels indicating an edge in the input image.

The drawing color decision unit included in the focused portion presentation controller 112 according to the second example, for example, decides a color based on a color extracted from the target image (or the input image) as the second image color when the input image is a monochrome image. The color based on the color extracted from the target image for decision of the second image color may be, for example, a color of each pixel indicating an edge in the target image, a representative color (e.g., majority color) of pixels indicating the edge, the average color of the colors of the pixels indicating the edge or the like.

The focused portion presentation controller 112 according to the second example decides the second image color on the basis of the input image through the drawing color decision unit, and thus the presentation controller 106 may generate a presented image on which degrees of focus are indicated according to a presentation scheme corresponding to the target image and display the generated presented image on the display screen.

The focused portion presentation controller 112 according to the second example includes a mixing unit having the same function as the mixing unit 132 included in the focused portion presentation controller 112 according to the first example illustrated in FIG. 18, and mixes the input image and an edge image represented by the first determination result.

Accordingly, the focused portion presentation controller 112 according to the second example may generate an image on which a degree of focus in a pixel unit based on the first determination result is indicated like the focused portion presentation controller 112 according to the first example illustrated in FIG. 18.

The configuration of the focused portion presentation controller 112 according to the second example is not limited to the aforementioned example. For example, the focused portion presentation controller 112 according to the second example may further include the background processing unit like the focused portion presentation controller 112 according to the first example illustrated in FIG. 18.

(2-3) Third Example of Processing in Focused Portion Presentation Controller 112

The configuration of the focused portion presentation controller 112 is not limited to the configuration according to the first example (2-1) and the configuration according to the second example (2-2). For example, the drawing color decision unit included in the focused portion presentation controller 112 may decide the second image color using an illuminance value (an example of a result of detection of external light with respect to the display screen) detected by the sensor 168 or the like in addition to the function of the drawing color decision unit 130 included in the focused portion presentation controller 112 according to the first example illustrated in FIG. 18.

The drawing color decision unit included in the focused portion presentation controller 112 according to the third example decides the second color by adjusting brightness of a decided color, for example, based on the illuminance value like the drawing color decision unit 130 illustrated in FIG. 18. The drawing color decision unit included in the focused portion presentation controller 112 according to the third example decides the second image color using the first brightness adjustment information, for example, as illustrated in FIG. 16, for example, like the drawing color decision unit 128 included in the focused region presentation controller 110 illustrated in FIG. 15.

The focused portion presentation controller 112 according to the third example decides the second image color using the detected illuminance value through the drawing color decision unit, and thus the presentation controller 106 may generate a presented image on which degrees of focus are indicated according to a presentation scheme corresponding to a result of detection of external light with respect to the display screen and display the generated presented image on the display screen.

The focused portion presentation controller 112 according to the third example includes a mixing unit having the same function as the mixing unit 132 included in the focused portion presentation controller 112 according to the first example illustrated in FIG. 18, and mixes the input image and the edge image represented by the first determination result.

Accordingly, the focused portion presentation controller 112 according to the third example may generate an image on which a degree of focus in a pixel unit based on the first determination result is indicated like the focused portion presentation controller 112 according to the first example illustrated in FIG. 18.

The configuration of the focused portion presentation controller 112 according to the third example is not limited to the aforementioned example.

For example, the focused portion presentation controller 112 according to the third example may further include the background processing unit like the focused portion presentation controller 112 according to the first example illustrated in FIG. 18.

The focused portion presentation controller 112 according to the third example may adjust brightness of an image input thereto using an illuminance value detected by the sensor 168 or the like. The focused portion presentation controller 112 according to the third example adjusts the brightness of the input image using the second brightness adjustment information, for example, as illustrated in FIG. 17 like the focused region presentation controller 110 illustrated in FIG. 15.

The focused portion presentation controller 112 according to the third example adjusts brightness of the image input thereto using the detected illuminance value, and thus the brightness of the input image is varied in connection with the second image color representing an edge in the edge image. Accordingly, the focused portion presentation controller 112 according to the third example may adjust the brightness of the input image using the detected illuminance value, for example, to maintain contrast between the second image color representing the edge in the edge image and the background image of the input image as a predetermined level or higher.

Here, the process of adjusting brightness of the input image using the illuminance value detected by the sensor 168 or the like is performed, for example, by the mixing unit included in the focused portion presentation controller 112 according to the third example.

The focused portion presentation controller 112 generates an image on which a degree of focus in a pixel unit is indicated for the target image on the basis of, for example, the first determination result using the configuration according to the first example (2-1), the configuration according to the second example (2-2) or the configuration according to the third example (2-3). The configuration of the focused portion presentation controller 112 is not limited to the configuration according to the first example (2-1), the configuration according to the second example (2-2) and the configuration according to the third example (2-3). For example, the focused portion presentation controller 112 may have a configuration corresponding to a combination of the configuration according to the second example (2-2) and the configuration according to the third example (2-3).

The presentation controller 106 controls presentation of degrees of focus in the target image on the basis of the first determination result transmitted from the first determination unit 102 and the second determination result transmitted from the second determination unit 104, for example, by including the aforementioned focused region presentation controller 110 and the focused portion presentation controller 112. For example, the presentation controller 106 may perform the aforementioned process to obtain presented images represented by, for example, E in FIGS. 3 to 8.

Processing in the presentation controller 106 according to the present embodiment is not limited to the aforementioned processes.

For example, the presentation controller 106 may generate a presented image on which degrees of focus are indicated according to a presentation scheme corresponding to an object included in the target image on the basis of a result of a process of detecting the object from the target image and display the generated presented image on the display screen. The presentation controller 106 may display a presented image having, for example, enhanced visibility on the display screen by indicating degrees of focus according to a presentation scheme corresponding to an object included in the target image. The process of detecting an object may be performed by the object detector (not illustrated) included in the image processing apparatus 100 or an external device of the image processing apparatus 100. When the image processing apparatus 100 includes the object detector (not illustrated), the object detector (not illustrated) may be included in the presentation controller 106 or may be implemented as a processing circuit separated from the presentation controller 106.

Here, "enhancing visibility" according to the present embodiment refers to, for example, changing brightness or colors and displaying the same or improving a state in which an excessively large or excessively small number of degrees of focus are indicated such that indicated degrees of focus are more easily seen.

The presentation controller 106 may selectively perform processing for enhancing visibility depending on the size of a detected object, for example, even when the object is detected. For example, the presentation controller 106 does not perform processing for enhancing visibility when the size of the detected object is equal to or less than a predetermined threshold value (or when the size of the object is less than the threshold value). The presentation controller 106 performs processing for enhancing visibility, for example, when the size of the object is greater than the threshold value (or when the size of the detected object is equal to or greater than the predetermined threshold value).

Detailed examples of a case in which "enhancing visibility" according to the present embodiment is realized will now be described.

For example, when a face (an example of an object) is detected from the target image, a face region including the face has many low-frequency components. Accordingly, it may be difficult, for example, to draw an edge and to indicate a degree of focus in a pixel unit in the face region. Therefore, the presentation controller 106 maintains visibility by thickening only lines included in the detected face region or emphasizing and displaying a region w(n) corresponding to the face region.

For example, when a subject (an example of an object) is detected from the target image, the presentation controller 106 modifies drawing on the basis of characteristics of the detected subject, for example, as follows.

The presentation controller 106 reduces the quantity of drawing for edge representation (performs improvements in a state in which it is difficult to recognize details because an outline is excessively emphasized) for a portion having many high-frequency components in a region including the detected subject.

The presentation controller 106 emphasizes and displays a focused region for a portion having a small quantity of high-frequency components in the region including the detected subject (a degree of focus in a region unit is emphasized because it is difficult to express an edge when the quantity of high-frequency components is small).

The presentation controller 106 decides a brighter color as the first image color or the second image color for a dark portion in the region including the detected subject.

The presentation controller 106 decides a darker color as the first image color of the second image color for a bright portion in the region including the detected subject.

The presentation controller 106 decides the first image color or the second image color in response to a representative color (e.g., majority color) in the region including the detected subject.

The presentation controller 106 decreases the mixing ratio in the region including the detected subject.

When the presentation controller 106 modifies drawing in response to characteristics of the detected subject, for example, as described above, the presentation controller 106 may, for example, modify drawing based on a region that is more likely to be captured by the user. Accordingly, the presentation controller 106 may modify drawing in response to characteristics of the detected subject, for example, as described above, to thereby improve visibility compared to a case in which drawing is adjusted for the entire image.

Detailed examples of a case in which "enhancing visibility" according to the present embodiment is realized are not limited to the above examples. For example, when the target image is a moving image, the presentation controller 106 may modify drawing on the basis of a movement amount of an object detected from the target image.

The image processing apparatus 100 performs processes (e.g., the process of determining a degree of focus in a pixel unit from the target image, the process of determining a degree of focus in a region unit from the target image and the presentation control process) according to the image processing method according to the present embodiment on the basis of, for example, the configuration illustrated in FIG. 2.

Accordingly, the image processing apparatus 100 may allow the user to recognize degrees of focus in an image according to, for example, the configuration shown in FIG. 2.

The image processing apparatus 100 may achieve the effects obtained by performing the processes according to the image processing method according to the present embodiment described above, according to the configuration illustrated in FIG. 2, for example.

The configuration of the image processing apparatus according to the present embodiment is not limited to the configuration illustrated in FIG. 2.

For example, when the first determination result and the second determination result are obtained from a determination device having the same function and configuration as the first determination unit 102 and the second determination unit 104, the image processing apparatus according to the present embodiment may have a configuration that does not include the first determination unit 102 and the second determination unit 104 illustrated in FIG. 2.

The determination device according to the present embodiment is an external device of the image processing apparatus according to the present embodiment and another image processing apparatus. The determination device according to the present embodiment has the same hardware configuration (including modifications) as, for example, the image processing apparatus 100 illustrated in FIG. 9 to implement the same functions as the first determination unit 102 and the second determination unit 104 thereof.

When at least one of the first determination result and the second determination result is obtained from a first external device having the same function and configuration as the first determination unit 102 and a second external device having the same function and configuration as the second determination unit 104, the image processing apparatus according to the present embodiment may not include the determination unit corresponding to the obtained determination result.

Here, the image processing apparatus according to the present embodiment may perform presentation control processing as processing of the image processing method according to the present embodiment even when the image processing apparatus according to the present embodiment does not include one or either of the first determination unit 102 and the second determination unit 104 illustrated in FIG. 2.

Accordingly, the image processing apparatus according to the present embodiment may allow the user to recognize degrees of focus in an image even when the image processing apparatus has a configuration that does not include one or either of the first determination unit 102 and the second determination unit 104 illustrated in FIG. 2.

When the image processing apparatus according to the present embodiment obtains the first determination result and the second determination result from the determination device according to the present embodiment, an image processing system that performs the same process as the image processing apparatus 100 illustrated in FIG. 2 according to the determination device according to the present embodiment and the image processing apparatus according to the present embodiment is realized.

Accordingly, it may be possible to implement an image processing system that may allow the user to recognize degrees of focus in an image according to the determination device according to the present embodiment.

While the image processing apparatus has been described as the present embodiment, the present embodiment is not limited to the relevant embodiment. For example, the present embodiment is applicable to a variety of devices such as photographing devices such as a digital still camera or a digital video camera, communication devices such as a cellular phone or a smartphone, tablet type devices, computers such as a personal computer (PC) or a server, display devices, video/audio players (or video/audio recording/reproducing devices), game devices and the like. In addition, the present embodiment is also applicable to processing integrated circuits (ICs) that may be integrated into the aforementioned devices.

Furthermore, the image processing apparatus according to the present embodiment may be implemented, for example, by a system including a plurality of devices based on connection to a network (or communication between devices) such as cloud computing. That is, the aforementioned image processing apparatus according to the present embodiment may be implemented as a system composed of a plurality of devices.

In addition, while the determination device has been described as the present embodiment, the present embodiment is not limited to the relevant embodiment. The present embodiment is applicable to a variety of devices such as photographing devices such as a digital still camera or a digital video camera, communication devices such as a cellular phone or a smartphone, tablet type devices, computers such as a PC or a server, display devices, video/audio players (or video/audio recording/reproducing devices), game devices and the like. In addition, the present embodiment is also applicable to processing integrated circuits (ICs) that may be integrated into the aforementioned devices.

(Program According to Present Embodiment)

[I] Program for Functioning as Image Processing Apparatus According to Present Embodiment A program (for example, a program that may execute the processes of the image processing method according to the present embodiment such as "the presentation control process," "the process of determining a degree of focus in a pixel unit from the target image and the presentation control process," "the process of determining a degree of focus in a region unit from the target image and the presentation control process," and "the process of determining a degree of focus in a pixel unit from the target image, the process of determining a degree of focus in a region unit from the target image and the presentation control process") that allows a computer to function as the image processing apparatus according to the present embodiment may be executed by a processor in the computer to allow the user to recognize degrees of focus in an image.

In addition, a program that enables a computer to function as the image processing apparatus according to the present embodiment may be executed by a processor or the like in the computer to achieve the effects obtained by the processes of the aforementioned image processing method according to the present embodiment.

[II] Program for Functioning as Determination Device According to Present Embodiment A program (for example, a program for executing "the process of determining a degree of focus in a pixel unit from the target image and the process of determining a degree of focus in a region unit from the target image") that enables a computer to function as the determination device according to the present embodiment may be executed by a processor in the computer to implement an image processing system that may allow the user to recognize degrees of focus in an image.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while programs (computer programs) for enabling a computer to serve as the image processing apparatus according to the present embodiment and the determination device according to the present embodiment are provided in the above description, the present embodiment may provide recording media storing the programs separately or a recording medium storing the programs together.

The above configuration shows an example of the present embodiment and naturally comes under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
An image processing apparatus including:
a presentation controller configured to control presentation of degrees of focus in a target image corresponding to an image to be processed on the basis of a first determination result corresponding to a determination result of a degree of focus in a pixel unit in the target image and a second determination result corresponding to a determination result of a degree of focus in a region unit in the target image.

(2)
The image processing apparatus according to (1), wherein the presentation controller displays a presented image based on the target image, on which the degrees of focus are indicated according to a presentation scheme based on at least one of the first determination result and the second determination result, on a display screen.

(3)
The image processing apparatus according to (2), wherein the presentation controller displays the presented image on which both the degree of focus in a pixel unit based on the first determination result and the degree of focus in a region unit based on the second determination result are indicated.

(4)
The image processing apparatus according to (2), wherein the presentation controller displays the presented image on which one of the degree of focus in a pixel unit based on the first determination result and the degree of focus in a region unit based on the second determination result is indicated.

(5)
The image processing apparatus according to any one of (2) to (4), wherein the presentation controller switches and displays the presented image on which one of the degree of focus in a pixel unit based on the first determination result and the degree of focus in a region unit based on the second determination result is indicated and the presented image on which both the degree of focus in a pixel unit and the degree of focus in a region unit are indicated, on the basis of a user operation.

(6)
The image processing apparatus according to (4), wherein the presentation controller displays the presented image on which one of the degree of focus in a pixel unit and the degree of focus in a region unit is indicated on the basis of information on accuracy of degrees of focus corresponding to the first determination result and information on accuracy of degrees of focus corresponding to the second determination result.

(7)
The image processing apparatus according to any one of (2) to (6), wherein the presentation controller displays the presented image on which the degrees of focus are indicated according to a presentation scheme corresponding to an object included in the target image.

(8)
The image processing apparatus according to any one of (2) to (7), wherein the presentation controller adjusts colors of the target image and displays the presented image based on the color-adjusted target image.

(9)
The image processing apparatus according to any one of (2) to (8), wherein the presentation controller displays the presented image on which the degrees of focus are indicated according to a presentation scheme corresponding to the target image.

(10)
The image processing apparatus according to any one of (2) to (9), wherein the presentation controller displays the presented image on which the degrees of focus are indicated according to a presentation scheme corresponding to the display screen.

(11)
The image processing apparatus according to any one of (2) to (10), wherein the presentation controller displays the presented image on which the degrees of focus are indicated according to a presentation scheme corresponding to a detection result of external light with respect to the display screen.

(12)
The image processing apparatus according to any one of (2) to (11), wherein the presentation controller displays the presented image on which the degrees of focus are indicated according to a presentation scheme corresponding to the second determination result.

(13)
The image processing apparatus according to any one of (1) to (12), further including:
a first determination unit configured to determine the degree of focus in a pixel unit from the target image,
wherein the presentation controller controls presentation of degrees of focus in the target image on the basis of the first determination result in the first determination unit.

(14)
The image processing apparatus according to (13), wherein the first determination unit determines the degree of focus in a pixel unit according to a filter corresponding to a display screen on which the presented image is displayed based on the target image, on which the degrees of focus are indicated according to a presentation scheme based on at least one of the first determination result and the second determination result.

(15)
The image processing apparatus according to any one of (1) to (14), further including:
a second determination unit configured to determine the degree of focus in a region unit from the target image,
wherein the presentation controller controls presentation of degrees of focus in the target image on the basis of the second determination result in the second determination unit.

(16)
The image processing apparatus according to (15), wherein the second determination unit determines the degree of focus according to a first determination criterion corresponding to a criterion for determination, for a region including no object in the target image, and determines the degree of focus according to a second determination criterion corresponding to an object, for a region including the object in the target image.

(17)
An image processing apparatus including:
a first determination unit configured to determine a degree of focus in a pixel unit from a target image corresponding to an image to be processed; and
a second determination unit configured to determine a degree of focus in a region unit from the target image.

(18)
The image processing apparatus according to (17), wherein the second determination unit determines the degree of focus in a region unit using a decision machine obtained according to machine learning using a focused learning image and an unfocused learning image.

(19)
An image processing method performed by an image processing apparatus, including:

a step of controlling presentation of degrees of focus in a target image corresponding to an image to be processed on the basis of a first determination result corresponding to a determination result of a degree of focus in a pixel unit in the target image and a second determination result corresponding to a determination result of a degree of focus in a region unit in the target image.

(20)

A program for causing a computer to execute:

a step of controlling presentation of degrees of focus in a target image corresponding to an image to be processed on the basis of a first determination result corresponding to a determination result of a degree of focus in a pixel unit in the target image and a second determination result corresponding to a determination result of a degree of focus in a region unit in the target image.

REFERENCE SIGNS LIST 100 image processing apparatus
102 first determination unit
104 second determination unit
106 presentation controller
110 focused region presentation controller
112 focused portion presentation controller
120 background processing unit
122, 126, 128 and 130 drawing color decision unit
124 and 132 mixing unit

The invention claimed is:

1. An image processing apparatus, comprising:
circuitry configured to:
  determine a first degree of focus in a pixel of a target image, wherein the target image comprises a plurality of regions;
  determine a second degree of focus in a region of the plurality of regions of the target image;
  determine a ratio of a number of focused regions of the plurality of regions of the target image to a total number of the plurality of regions of the target image,
    wherein the determination of the ratio corresponds to the determination of the second degree of focus in the region of the target image;
  control a presentation of a third degree of focus in the target image; based on at least one of the determined first degree of focus in the pixel of the target image or the determined second degree of focus in the region of the target image; and
  control a display screen to display a first presented target image,
    wherein the third degree of focus is indicated in the displayed first presented target image based on the determined ratio of the number of focused regions of the plurality of regions of the target image to a total number of the plurality of regions of the target image.

2. The image processing apparatus according to claim 1, wherein the circuitry is further configured to control the display screen to display a second presented target image, and
wherein the third degree of focus is indicated in the displayed second presented target image based on at least one of the determined first degree of focus in the pixel of the target image or the determined second degree of focus in the region of the target image.

3. The image processing apparatus according to claim 2, wherein the circuitry is further configured to control the display screen to display a third presented target image, and
wherein the third degree of focus is indicated in the displayed third presented target image is based on each of the determined first degree of focus in the pixel of the target image and the determined second degree of focus in the region of the target image.

4. The image processing apparatus according to claim 2, wherein the circuitry is further configured to display a third presented target image, and
wherein the third degree of focus is indicated in the displayed third presented target image based on one of the determined first degree of focus in the pixel of the target image or the determined second degree of focus in the region of the target image.

5. The image processing apparatus according to claim 2, wherein the circuitry is further configured to switch a display, between a third presented target image and a fourth presented target image, based on a user operation,
wherein the third degree of focus is indicated in the displayed third presented target image based on one of the determined first degree of focus in the pixel of the target image or the determined second degree of focus in the region of the target image, and
wherein the third degree of focus is indicated in the displayed fourth presented target image based on the determined first degree of focus in the pixel of the target image and the determined second degree of focus in the region of the target image.

6. The image processing apparatus according to claim 4, wherein the circuitry is further configured to:
  determine first information on accuracy corresponding to the determination of the first degree of focus in the pixel of the target image; and
  determine second information on accuracy corresponding to the determination of the second degree of focus in the region of the target image,
    wherein the second information on accuracy corresponds to the determined ratio of the number of focused regions of the target image to the total number of the plurality of regions of the target image, and
    wherein the third degree of focus is indicated in the displayed third presented target image based on the determined first information on accuracy and the determined second information on accuracy.

7. The image processing apparatus according to claim 2, wherein the circuitry is further configured to control the display screen to display a third presented target image, and
wherein the third degree of focus is indicated based on an object that is included in the target image.

8. The image processing apparatus according to claim 2, wherein the circuitry is further configured to:
  adjust colors of the target image; and
  control the display screen to display a third presented target image based on the adjusted colors of the target image.

9. The image processing apparatus according to claim 2, wherein the circuitry is further configured to control the display screen to display a third presented target image, and
wherein the third degree of focus is indicated in the displayed third presented target image based on a presentation scheme corresponding to the target image.

10. The image processing apparatus according to claim 2,
wherein the circuitry is further configured to control the display screen to display a third presented target image, and
wherein the third degree of focus is indicated in the displayed third presented target image based on a presentation scheme corresponding to the display screen.

11. The image processing apparatus according to claim 2, further comprising a sensor configured to detect external light with respect to the display screen
wherein the circuitry is further configured to control the display screen to display a third presented target image, and
wherein the third degree of focus is indicated in the displayed third presented target image based on a detection result of the external light with respect to the display screen.

12. The image processing apparatus according to claim 2,
wherein the circuitry is further configured to control the display screen to display a third presented target image, and
wherein the third degree of focus is indicated in the displayed third presented target image based on the determined second degree of focus of the region of the target image.

13. The image processing apparatus according to claim 1, wherein the circuitry is further configured to control the presentation of the third degree of focus in the target image based on the determination of the first degree of focus in the pixel of the target image.

14. The image processing apparatus according to claim 13, wherein the circuitry is further configured to determine the first degree of focus in the pixel of the target image based on a filter that corresponds to the display screen.

15. The image processing apparatus according to claim 1, wherein the circuitry is further configured to control the presentation of the third degree of focus in the target image based on the determination of the second degree of focus in the region of the target image.

16. The image processing apparatus according to claim 15,
wherein the circuitry is further configured to determine, the second degree of focus in at least one region of the plurality of regions of the target image, based on at least one of a first determination criterion or a second determination criterion,
wherein the first determination criterion corresponds a first region of the at least one region,
wherein the first region lacks an object in the target image,
wherein the second determination criterion corresponds a second region of the at least one region, and
wherein the second region includes the object in the target image.

17. An image processing apparatus, comprising:
circuitry configured to:
determine a first degree of focus in a pixel of a target image, wherein the target image comprises a plurality of regions;
determine a second degree of focus in a region of the plurality of regions of the target image; and
determine a ratio of a number of focused regions of the plurality of regions of the target image to a total number of the plurality of regions of the target image,
wherein the determination of the ratio corresponds to the determination of the second degree of focus in the region of the target image.

18. The image processing apparatus according to claim 17, wherein the circuitry is further configured to determine the second degree of focus in the region of the target image based on a focused learning image and an unfocused learning image.

19. An image processing method comprising:
determining a first degree of focus in a pixel of a target image, wherein the target image comprises a plurality of regions;
determining a second degree of focus in a region of the plurality of regions of the target image;
determining a ratio of a number of focused regions of the plurality of regions of the target image to a total number of the plurality of regions of the target image,
wherein the determined ratio corresponds to the determination of the second degree of focus in the region of the target image; and
controlling a presentation of a third degree of focus in the target image based on the determined second degree of focus in the region of the target image; and
controlling a display screen to display a first presented target image,
wherein the third degree of focus is indicated in the displayed first presented target image based on the determined ratio of the number of focused regions of the plurality of regions of the target image to a total number of the plurality of regions of the target image.

20. A non-transitory computer-readable medium having stored thereon, computer-executable instructions, which when executed by an image processing apparatus, cause the image processing apparatus to execute operations, the operations comprising:
determining a first degree of focus in a pixel of a target image, wherein the target image comprises a plurality of regions;
determining a second degree of focus in a region of the plurality of regions of the target image;
determining a ratio of a number of focused regions of the plurality of regions of the target image to a total number of the plurality of regions of the target image,
wherein the determined ratio corresponds to the determination of the second degree of focus in the region of the target image; and
controlling a presentation of a third degree of focus in the target image based on the determined first degree of focus in the pixel of the target image and the determined second degree of focus in the region of the target image; and
controlling a display screen to display a first presented target image,
wherein the third degree of focus is indicated in the displayed first presented target image based on the determined ratio of the number of focused regions of the plurality of regions of the target image to a total number of the plurality of regions of the target image.

* * * * *